United States Patent [19]

Yamamoto

[11] Patent Number: 5,583,602
[45] Date of Patent: Dec. 10, 1996

[54] AUTOFOCUS SINGLE-LENS REFLEX CAMERA

[75] Inventor: Masaru Yamamoto, Machida, Japan

[73] Assignee: Kyocera Corporation, Kyoto, Japan

[21] Appl. No.: 497,136

[22] Filed: Jun. 30, 1995

Related U.S. Application Data

[63] Continuation of Ser. No. 226,004, Apr. 7, 1994, abandoned.

[51] Int. Cl.$^6$ .................................................. G03B 13/36
[52] U.S. Cl. ........................ 396/133; 396/137; 396/508
[58] Field of Search ........................... 354/400, 402–409, 354/195.11, 195.12

[56] References Cited

U.S. PATENT DOCUMENTS 5,231,443  7/1993  Subbarao .................................. 354/400

FOREIGN PATENT DOCUMENTS 224640   1/1990  Japan.
5173225  7/1993  Japan.

OTHER PUBLICATIONS

Hajime Miyabe, "Photographic Industries", (Shashin-Kogyo), vol. 2, No. 10, pp. 160–161, Mar. 1, 1953, (showa 28).

*Primary Examiner*—Russell E. Adams
*Attorney, Agent, or Firm*—Loeb & Loeb LLP

[57] ABSTRACT

Disclosed is a back-focal distance control system autofocus single-lens reflex camera wherein a single-lens reflex camera body is sectioned into two blocks, one block is a fixed block while the other block is a movable block, the movable block is moved in the optical-axis direction of a lens on the basis of the fixed block, and autofocus control is conducted by adjusting a flange-focal distance of the camera.

Autofocusing is attainable even by installing a manual interchangeable lens and other AF interchangeable lenses. Further, a switching operability between MF/AF operations is enhanced, and super close-range photography can be also effected. Extended further is a possible-of-AF range (from super close-range to super infinity) in combination with AF of a lens drive system. At the same time, the AF operation is conducted at a high speed with a high accuracy. Further, even when installing a lens larger in size than a standard lens, a reliability on the operation of a diaphragm mechanism is enhanced.

13 Claims, 32 Drawing Sheets

FRONT BLOCK (A)
REAR BLOCK (B)

A-A SECTION

FIG. 7

| TYPES OF LENSES | SHORTEST PHOTOGRAPHING DISTANCE Do (mm) | EXTENSION QUANTITY Bf(x) (mm) | FOCAL LENGTH f (mm) | INTER PRINCIPAL PLANE DISTANCE δ (mm) | FOCUS-DETECTION CALCULATING CORRECTION VALUE k |
|---|---|---|---|---|---|
| 1 LENS A | $D_1$ | $Bf(x_1)$ | $f_1$ | $\delta_1$ | $\Delta k_1$ |
| 2 " B | $D_2$ | $Bf(x_2)$ | $f_2$ | $\delta_2$ | $\Delta k_2$ |
| 3 " C | $D_3$ | $Bf(x_3)$ | $f_3$ | $\delta_3$ | $\Delta k_3$ |
| 4 " D | $D_4$ | $Bf(x_4)$ | $f_4$ | $\delta_4$ | $\Delta k_4$ |
| 5 " E | $D_5$ | $Bf(x_5)$ | $f_5$ | $\delta_5$ | $\Delta k_5$ |
| 6 " F | $D_6$ | $Bf(x_6)$ | $f_6$ | $\delta_6$ | $\Delta k_6$ |
| 7 " G | $D_7$ | $Bf(x_7)$ | $f_7$ | $\delta_7$ | $\Delta k_7$ |
| 8 " H | $D_8$ | $Bf(x_8)$ | $f_8$ | $\delta_8$ | $\Delta k_8$ |
| --- | --- | --- | --- | --- | --- |

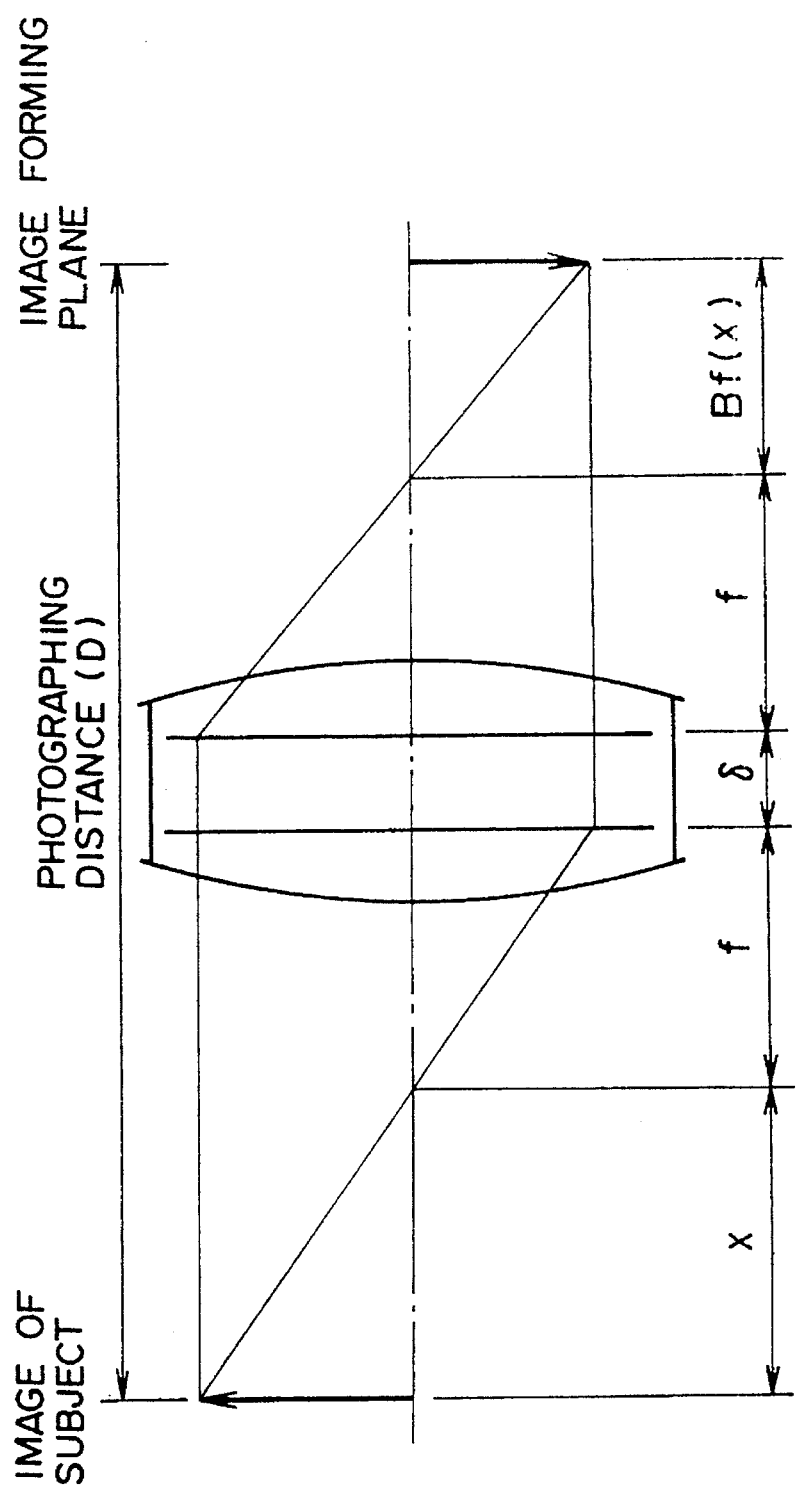

B-B SECTION

AUTOFOCUS SINGLE-LENS REFLEX CAMERA

This is a continuation of application Ser. No. 08/226,004 filed on Apr. 7, 1994, now abandoned.

BACKGROUND OF THE INVENTION

1. Field of the Invention

The present invention relates generally to a photographing lens interchangeable system autofocus single-lens reflex camera and, more particularly, to a back-focal distance control system autofocus single-lens reflex camera for performing autofocusing (AF) by adjusting a flange-focal distance.

2. Related Background Art

There exists a system of adjusting a focal point on a film plane by moving a film in the optical-axis direction of a photographing lens as a system of adjusting the focal point of the camera. There also exists a system of adjusting the focal point by regulating a range ring of the photographing lens.

A camera adopting the former film plane moving system was introduced in the Back-Focal Distance System (pp. 160 and 161, the issue of March, 1953, Shashin-Kogyo) of the Mamiya-Six (a camera brand name of Mamiya Camera, Co., Ltd.) In the camera taking this Back-Focal Distance System, as a matter of course, a shutter speed, an aperture (an adjustment of exposure) and also an adjustment of a focal length are manually performed.

FIG. 31 is a camera body cross-sectional view illustrating a mechanism in the vicinity of the film plane of this camera. A film chamber P accommodates a film. A member E receives the film plane. The film surface holding member E has rails provided up and down, and the film surface is received by this portion. A camera body includes two lengths of shafts $S_1$, $S_2$ extending vertically as illustrated in FIG. 31. The shafts $S_1$, $S_2$ are respectively fitted with cams by ones up and down, totally two pieces of disk-like cams $C_1$, $C_2$. A spring R is attached to upper and lower ends of the central portion of the film surface holding member E. Both ends of the spring R are pushed against peripheral surfaces of the cams $C_1$, $C_2$, resulting in a state where the cams $C_1$, $C_2$ are thrust in an arrowed direction D.

The shafts $S_1$, $S_2$ interlock with each other via an unillustrated gear. The cams $C_1$, $C_2$ rotate through the same angle with rotations of the shaft $S_1$, $S_2$. The film surface moves back and forth with rotations of these cams $C_1$, $C_2$.

An unillustrated gear is fixed to the uppermost portion of the shaft $S_1$. This gear is partly exposed outside from a rear surface of an upper cover of the camera. Accordingly, the photographer is capable of adjusting the focal point by manipulating the exposed portion of the gear with the thumb of a right hand while holding the camera. A range finder is interlocked to operate with rotations of the above gear. The focus adjustment can be confirmed through the range finder.

The above-described camera is of a manual focus adjustment system, wherein a back-focal distance is manually adjusted. This is a focus adjustment mechanism which is not adapted to a real situation when considering an actualization of the autofocus single-lens reflex camera.

Next proposed is another example of adjusting a position of a focal plane, wherein a CCD imaging device of an electronic still camera is moved (Japanese Patent Laid-Open No. 2-24640).

This proposal aims at obviating a problem caused when using an interchangeable lens of a photographing interchangeable type electronic still camera but a different camera, e.g., a silver halide camera. More specifically, the mount of the electronic still camera including an autofocusing apparatus assumes the same configuration of the mount of the interchangeable lens mounting unit of the silver halide camera including the autofocusing apparatus. Even if possible of mounting the silver halide camera interchangeable lens into the electronic still camera and driving the range ring of the photographing lens, though the photographing lens is stop-controlled to be focalized when installed in the silver halide camera, it happens that the photographing lens can be stopped so that the CCD imaging device enters the focal depth when installed in the electronic still camera, resulting in a defocus state. The arrangement for obviating this drawback is that the position of the CCD imaging device can be slightly shifted back and forth.

FIG. 32 is a cross-sectional view of the camera body, showing one example of the above electronic still camera. Referring to FIG. 32, a CCD 301 is employed as a solid-state imaging device. The numeral 302 represents a holding member of the CCD 301, and 303 designates a fixed unit of a camera body G. A piezoelectric element 304 serves to move the CCD imaging device 301 in the optical-axis direction. A focus-detection unit 305 measures a deviation of an image plane from the time when focalized on an arbitrary subject. This unit 305 is connected to a camera control circuit 319. The numeral 306 denotes a amount on the side of the camera body G. A camera-side electric signal contact 307 is held by the mount on the side of the camera body G. A return mirror 308 guides beams of light penetrating an optical system of an interchangeable lens unit H to a finder. An AF mirror 309 guides the beams passing through a half-mirror element of the return mirror 308 to the focus-detection unit 305. The numeral 310 represents a shutter, 313 designates a focusing lens, 316 indicates an AF motor, and 314 denotes a movable lens barrel for holding the focusing lens. A lens control circuit 318 includes a ROM for storing items of data such as an open F-number of the interchangeable lens, an image plane moving quantity with respect to the focusing lens 313, a focal length, a maximum defocus quantity and interchangeable lens identifying codes. Each time a power switch of the camera body is turned ON, or each time the interchangeable lens is replaced, the above data are transferred in the form of electric signals to the camera body.

When fitting the interchangeable lens unit H to the camera body G, this item of data is transferred as an electric signal to the camera body G. Then, the beams traveling through the interchangeable lens unit H are guided via the return mirror 308 to the finder. At the same time a part of the beams are incident on the focus-detection unit 305 through the AF mirror 309. The focus-detection unit 305 calculates a deviation quantity of the image plane and transfers this quantity to the camera control circuit 319. The camera control circuit 319 further converts a moving quantity of the focusing lens 313 and transfers this quantity to the lens control circuit 318 via the electric signal contacts 307, 312. The lens control circuit 318 converts data about the moving quantity given from the camera control circuit 319 into a rotational quantity of the AF motor 316. The AF motor 316 is thereby driven to move the movable lens barrel 314 in the optical-axis direction through a helicoid member 314a. Whether focalized or not is confirmed based on the data of the focus-detection unit 305 in this state. If not focalized, focusing is performed by repeating the above operations.

By the way, when installing an interchangeable lens of a different camera, though the lens can be moved to the vicinity of the in-focus position, a minimum quantity with which the movement of the focusing lens is controllable is too large for the camera body G at this time. The in-focus state can not be obtained in some cases. Under such circumstances, the arrangement in this example goes as follows. A status as close to the in-focus state as possible is attained with the focusing lens 313, and the image plane deviation quantity is measured by the focus-detection unit 305. Alternatively, if the image plane deviation quantity falls within a fixed value, a remaining image plane deviation quantity till entering an in-focus area is transferred to the camera control circuit 319. A voltage is applied to the piezoelectric element 304, and the CCD imaging device is moved by the image plane deviation quantity in the optical-axis direction, thereby focusing on the subject.

The focus adjustment of the above electronic still camera is based on a system of focalizing by rotating the range ring of the lens. When using the interchangeable lens of the different camera, and if not focalized only by the range ring of the lens, the CCD imaging device is slightly moved in the optical-axis direction to be set as close to the vicinity of the in-focus position. Essentially, focusing is performed by propelling the lens. The film plane mechanism is a mechanism for compensating a defocus if not focused.

On the other hand, in the latter system of focusing by adjusting the range ring of the photographing lens, the utilized versions are a system of incorporating the motor as a drive source into the body and a system of incorporating it into the lens.

When adopting any of the above systems (of incorporating the motor into the body or the lens), the AF single-lens reflex camera generally employs a manual focus lens and an adaptor to make usable lenses other than the AF interchangeable lens for an exclusive use. Thus, other autofocus lenses can be installed. In the lenses other than the AF interchangeable lens for the exclusive use, the focal point has to be adjusted manually.

From the background described above, the inventors of this application have developed a back-focal distance control system autofocus single-lens reflex camera capable of automatically performing the focusing operation by using, as a matter of course, the AF interchangeable lens for the exclusive use and even a conventional manual interchangeable system lens or other AF interchangeable lenses.

It is a first object of the present invention to provide a back-focal distance control system autofocus single-lens reflex camera capable of improving a cost performance by making it possible to use any types of interchangeable lenses including a manual interchangeable lens, an AF interchangeable lens for an exclusive use and other drive system autofocus interchangeable lenses as autofocus lenses.

Next, when considering the usability in the back-focal distance control system autofocus single-lens reflex camera possible of autofocusing as well as in the conventional manual interchangeable lens as stated above, it is required that a flange-focal distance be in a predetermined position in the manual focus operation. It is because the lens installed is employed according to its performance and because there is caused no deviation in the distance indication of the lens range ring. Accordingly, when changed over to manual control from AF control, it is desirable that the flange-focal distance be in the above-mentioned position.

Further, when switching OFF the power supply or unused for a long period of time, the flange-focal distance is thereafter required to be in the predetermined position in consideration of the portability or the case of the manual focus operation effected immediately after switching ON the power supply.

The conventional autofocus single-lens reflex camera is structured so that lens data can be transferred from the ROM incorporated into the lens to the body side by installing an AF only lens. In this specification "AF only lens" hereinafter means an AF lens for the camera of this invention. The ROM data defined as the lens data for so-called lens driving contain a focal length, an extension quantity of the lens and correction value of its position, etc.. Accordingly, there is exhibited such a characteristic that the AF operation is conducted accurately and quickly.

By the way, when performing autofocusing through not the AF only lens but other autofocus lens or the manual focus lens in the above autofocus single-lens reflex camera, some of the former lenses (not the AF only lens but other AF lenses) do not include the ROM for storing the lens data. The latter lens (the manual focus lens) has not transferring element such as the electric contact or the like for transferring the data to the body side, and, therefore, it is impossible on the body side to judge what kind of photographing lens to install. For this reason, it follows that the judgement is made based on only the AF data relative to the beams of light from the subject which have passed through the photographing lens, and the AF operation carried out. Consequently, there arises a problem, wherein a focusing speed is slower than in effecting autofocusing by obtaining the lens data.

It is a second object of the present invention to provide a back-focal distance control system autofocus single-lens reflex camera capable of exhibiting a good portability and accommodation when not in use without causing a deviation of scales of a range ring when manipulating the manual focus lens.

It is a third object of the present invention to provide a back-focal distance control system autofocus single-lens reflex camera capable of quickly focusing at a high accuracy with respect to all the lens installed.

Next, in a lens drive system autofocus single-lens reflex camera, it is obvious that a variety of interchangeable lens have a limit in terms of close-up photography. Even when canceling AF and manually adjusting the focal point, it is similarly impossible to carry out the close-up photography in excess of the limit. Under such circumstances, a method of installing a close-up ring between the lens and the lens mount is taken for the close-up photography exceeding the lens adjustment limit. In this method, however, it takes a good deal of labors to attach and detach the lens and the close-up ring, and the close-up ring has to be carried for the close-up photography.

It is a fourth object of the present invention to provide a close-up photographing mechanism of the back-focal distance control system autofocus single-lens reflex camera, by which macro photography much closer up to a subject than a close-up limit of the conventional lens can be attained.

Next, in the prior art autofocus single-lens reflex camera, as explained earlier, there exist the systems of driving the range ring by incorporating the motor into the body and into the lens as the system of driving the lens range ring for focusing. In any systems, when canceling AF and changed over to the manual mode, there is provided a clutch mechanism for enabling the manual mode by cutting off the lens drive system. Further, an AF/MF changeover switch is installed in a location restricted by the lens driving system. For this reason, the following drawbacks are produced. If the subject proves awkward with an AF focus-detection, or if the photographer desires for a switchover to the manual focus mode during the AF operation, it is impossible to simply quickly effect the switchover to the MF mode. The photography can not shift from the autofocus mode to the manual focus mode depending on the circumstances corresponding to situations of the subjects.

It is a fifth object of the present invention to provide an AF canceling device of the autofocus single-lens reflex camera, which enables the photographer to employ high-level photographic techniques by performing a quick and smooth shift from the AF mode to the MF mode during the AF operation.

It is a sixth object of the present invention to provide an autofocus single-lens reflex camera including two AF drive mechanisms and capable of quickly performing the AF operation by use of lens ROM data through an AF only lens by selecting the AF drive mechanism in accordance with a type of a photographing lens installed and also effecting the AF operation through even a conventional manual lens.

Next, as stated above, in the back-focal distance control system autofocus single-lens reflex camera constructed of a camera body fixed block, a movable block and a mechanism for connecting these blocks, a diaphragm interlocking pin of an ordinary lens has a limit in its length. Hence, there is a possibility in which the lens diaphragm interlocking pin comes off an auto diaphragm lever of a mirror box mechanism, depending on a relative moving quantity of the movable block with respect to the camera body fixed block.

It is a seventh object of the present invention to provide an auto diaphragm mechanism of an autofocus single-lens reflex camera, wherein the lens diaphragm interlocking pin can be surely driven with a high accuracy.

Moreover, in the back-focal distance control system single-lens reflex camera, the back-focal distance drive control inevitably involves a considerable weight and capacity, though it depends on a design configuration because of the movable block incorporating an aperture element, a focus-detection mechanism and a finder mechanism. An important subject is that the movable block is precisely driven at a high speed.

The conventional AF drive control takes such an arrangement that some allowance is given to the power of the drive motor, and the movement to an in-focus position is made while measuring a micro-unit moving quantity from an initial stage of driving. Accordingly, there is a defect, wherein if a distance from a present position to the in-focus point is large, it takes much time for in-focus driving.

It is an eighth object of the present invention to provide a drive mechanism of a back-focal distance control system autofocus single-lens reflex camera capable of precisely moving the movable block unit to the in-focus position at a high speed.

SUMMARY OF THE INVENTION

For accomplishing the first object given above, according to one aspect of the present invention, there is provided a photographing lens interchangeable system autofocus single-lens reflex camera comprising: a camera body fixed block including at least a lens mount for installing a photographing lens, an AF driving source for autofocusing and a camera holding grip having a release button; a camera body movable block including at least a focus detection mechanism a finder mechanism and a film aperture element; and a block-to-block connection unit for connecting the camera body fixed block to the camera body movable block so that a distance between the fixed and movable blocks is adjustable, wherein a focal point is adjusted by moving the movable block in the optical-axis direction of the photographing lens with the AF driving source.

For accomplishing the second object given above, according to another aspect of the invention, in an autofocus single-lens reflex camera for focusing by adjusting a flange-focal distance of a photographing lens, comprising: a camera body fixed block including at least a lens mount for the photographing lens; a camera body movable block including at least a film aperture element; a block-to-block connection unit for connecting the camera body fixed block to the camera body movable block so that a distance between the fixed and movable blocks is adjustable; and an AF drive mechanism for adjusting a distance between the lens mount of the camera body fixed block and the aperture element of the movable block on the basis of AF data, there is provided the improvement comprising: a control unit for operating the AF drive mechanism so that a distance between the lens mount of the camera body fixed block and the film aperture element of the camera body movable block is adjusted to an infinity focal length position of the photographing lens when a switching element for switching over AF and MF is switched over to MF, or when a power switch of the camera body is turned OFF.

For accomplishing the third object given above, according to still another aspect of the invention, in an autofocus single-lens reflex camera for focusing by adjusting a flange-focal distance of a photographing lens, comprising: a camera body fixed block including at least a lens mount for the photographing lens; a camera body movable block including at least a film aperture element; a block-to-block connection unit for connecting the camera body fixed block to the camera body movable block so that a distance between the fixed and movable blocks is adjustable; and an AF drive mechanism for adjusting a distance between the lens mount of the camera body fixed block and the aperture element of the movable block on the basis of AF data, there is provided the improvement comprising: a storage unit for storing characteristic data about a multiplicity of photographing lenses installed in the lens mount of the camera body fixed block; a selecting element for selecting a type of the photographing lens installed in the lens mount of the camera body fixed block; and a control element for reading the data of the photographing lens selected by the selecting element, calculating an accurate defocus quantity and a moving quantity between the fixed and movable blocks from focus-detection data obtained simultaneously and controlling the AF drive mechanism on the basis of calculation data thereof.

For accomplishing the fourth object given above, according to a further aspect of the invention, in an autofocus single-lens reflex camera for focusing by adjusting a flange-focal distance of a photographing lens, comprising: a camera body fixed block including at least a photographing lens and a lens mount for the photographing lens; a camera body movable block including at least a film aperture element; a block-to-block connection unit for connecting the camera body fixed block to the camera body movable block so that a distance between the fixed and movable blocks is adjustable; and an AF drive mechanism for adjusting a distance between the lens mount of the camera body fixed block and the aperture element of the movable block on the basis of AF data, there is provided the improvement comprising: a macro photography operation unit for designating close-up photography; and a control element for driving the AF drive mechanism when the macro photography operation unit designates the close-up photography and shift-controlling a distance between the lens mount of the camera body front block and the aperture element of the rear block to a maximum distance, wherein the flange-focal distance of the photographing lens is set to a maximum position, and a close-up photographic range based on a lens manual adjustment is extended.

For accomplishing the fifth object given above, according to a still further aspect of the invention, there is provided an autofocus single-lens reflex camera comprising: a mode selecting element for selecting an AF cancel mode; a sensor for detecting a contact with a release button; a first detecting element for detecting a first stroke position of the release button; a second detecting element for detecting a second stroke position of the release button; and a control element for performing an AF mode operation when the sensor detects the contact with the release button, canceling and shifting the AF mode operation to an MF mode when the mode selecting element selects the AF cancel mode and when the release button reaches the first stroke and effecting control to execute a shutter action when further reaching the second stroke.

For accomplishing the sixth object given above, according to a yet further aspect of the invention, there is provided an autofocus single-lens reflex camera comprising: a camera body fixed block including at least a lens mount capable of incorporating any of a manual focus adjusting type lens and an autofocus only lens; a camera body movable block including at least a film aperture element; a block-to-block connection unit for connecting the camera body fixed block to the camera body movable block so that a distance between the fixed and movable blocks is adjustable; a first AF drive mechanism for focusing by adjusting a distance between the lens mount of the camera body fixed block and the aperture element of the movable block on the basis of AF data; and a second AF drive mechanism for focusing by propelling the lens on the basis of the AF data.

For similarly accomplishing the sixth object given above, in addition to the construction provided one before, the autofocus single-lens reflex camera further comprises: a fiducial position setting element for driving the first AF drive mechanism by attaching and detaching the photographing lens and setting a distance between the camera body fixed and movable blocks to a position of a infinity focal length of the photographing lens; an auto determining element for automatically determining whether the photographing lens installed is an AF only lens or a manual focus adjusting type lens; and a control element for performing the AF operation by controlling the first AF drive mechanism when the auto determining element determines the lens to be the manual focus adjusting type lens and controlling the second AF drive mechanism when the auto determining element determines the lens to be the AF only lens.

For similarly accomplishing the sixth object given above, in addition to the construction provided two before, the autofocus single-lens reflex camera further comprises: a fiducial position setting element for driving the first AF drive mechanism by attaching and detaching the photographing lens and setting a distance between the camera body fixed and movable blocks to a position of a infinity focal length of the photographing lens; an auto determining element for automatically determining whether the photographing lens installed is an AF only lens or a manual focus adjusting type lens) and a simultaneous operation mode control element for performing the AF operation by propelling the AF only lens installed when the auto determining element determines the lens to be the AF only lens and adjusting a distance between the lens mount of the camera body fixed block and the aperture element of the movable block.

For similarly accomplishing the sixth object given above, in addition to the construction provided three before, the autofocus single-lens reflex camera further comprises: a fiducial position setting element for driving the first AF drive mechanism by attaching and detaching the photographing lens and setting a distance between the camera body fixed and movable blocks to a position of a infinity focal length of the photographing lens; an auto determining element for automatically determining whether the photographing lens installed is an AF only lens or a manual focus adjusting type lens; and a serial AF operation mode control element for performing the AF operation by controlling the first AF drive mechanism when the auto determining element determines the lens to be the manual focus adjusting type lens, determining whether or not the lens propelled comes to a close-range photographing limit while controlling the second AF drive mechanism when the auto determining element determines the lens to be the AF only lens and, when reaching the close-range photographing limit, effecting switchover AF control on the first AF drive mechanism.

For similarly accomplishing the sixth object given above, in addition to the construction provided four before, the autofocus single-lens reflex camera further comprises: a fiducial position setting element for driving the first AF drive mechanism by attaching and detaching the photographing lens and setting a distance between the camera body fixed and movable blocks to a position of an infinity focal length of the photographing lens; an auto determining element for automatically determining whether the photographing lens installed is an AF only lens or a manual focus adjusting type lens; and a BFD mode control element for performing the AF operation by controlling the first AF drive mechanism when the auto determining element determines the lens to be the manual focus adjusting type lens, determining whether or not the lens is in a position of an infinity focal length when determining the lens to be the AF only lens, bringing the lens to an infinite position by the second AF drive mechanism when not in the position of the infinity focal length and performing AF control by the first AF drive mechanism in a state where the lens is in the position of the infinity focal length.

For accomplishing the seventh object given above, according to an additional aspect of the invention, in an autofocus single-lens reflex camera for focusing by adjusting a flange-focal distance of a photographing lens, comprising: a camera body fixed block including at least a photographing lens and a lens mount for the photographing lens; a camera body movable block including at least a film aperture element; a block-to-block connection unit for connecting the camera body fixed block to the camera body movable block so that a distance between the fixed and movable blocks is adjustable; and an AF drive mechanism for adjusting a distance between the lens mount of the camera body fixed block and the aperture element of the movable block on the basis of AF data, there is provided an auto diaphragm mechanism of the autofocus single-lens reflex camera, comprising: a motor, driven by a stepping signal corresponding to an aperture quantity calculated by a control circuit to the camera body fixed block, for driving the diaphragm; a stop-down ring rotated by driving the motor and engaging with a diaphragm lever protruding from the photographing lens to make the diaphragm lever to follow, wherein a stop-down action is performed by driving the motor independently of an action of a mirror quick return mechanism for a period from a mirror-up action of the mirror quick return mechanism to a start of exposure by a shutter.

For accomplishing the eighth object given above, according to a still additional aspect of the invention, in an autofocus single-lens reflex camera for focusing by adjusting a flange-focal distance of a photographing lens, comprising: a camera body fixed block including at least a photographing lens and a lens mount for the photographing lens; a camera body movable block including at least a film aperture element; a block-to-block connection unit for connecting the camera body fixed block to the camera body movable block so that a distance between the fixed and movable blocks is adjustable; and an AF drive mechanism for adjusting a distance between the lens mount of the camera body fixed block and the aperture element of the movable block on the basis of AF data, there is provided the improvement comprising: a coarse drive unit for performing drive-control, when dividing an optical-axis parallel movable range of the camera body movable block into p-pieces of areas further subdividing each of the divided-by-p areas into q-pieces of segments, between the respective divided-by-p areas; and a fine drive unit for effecting the drive-control between the respective subdivided-by-q segments, wherein an in-focus position is controlled by simultaneously driving the coarse drive unit and the fine drive unit in accordance with a moving quantity obtained by effecting a conversion of a shift quantity on a predicted arithmetic value up to an in-focus point which is obtained from a focus-detection signal.

For similarly accomplishing the eighth object given above, in addition to the construction provided one before, in the autofocus single-lens reflex camera, the coarse drive unit and the fine drive unit are constructed by use of independent stepping motors each exhibiting a different characteristic.

BRIEF DESCRIPTION OF THE DRAWINGS

Other objects and advantages of the present invention will become apparent during the following discussion in conjunction with the accompanying drawings, in which:

FIG. 7 is a diagram showing an example of a Table containing various items of lens data stored in a lens ROM;

FIG. 8 is a diagram of assistance in explaining a principle of the lens;

FIG. 19 is a circuit diagram showing another embodiment of the control circuit of the camera of FIG. 15;

DESCRIPTION OF THE PREFERRED EMBODIMENTS

EMBODIMENTS

Most preferred embodiments of the present invention will hereinafter be described.

First Embodiment

Figure 1:
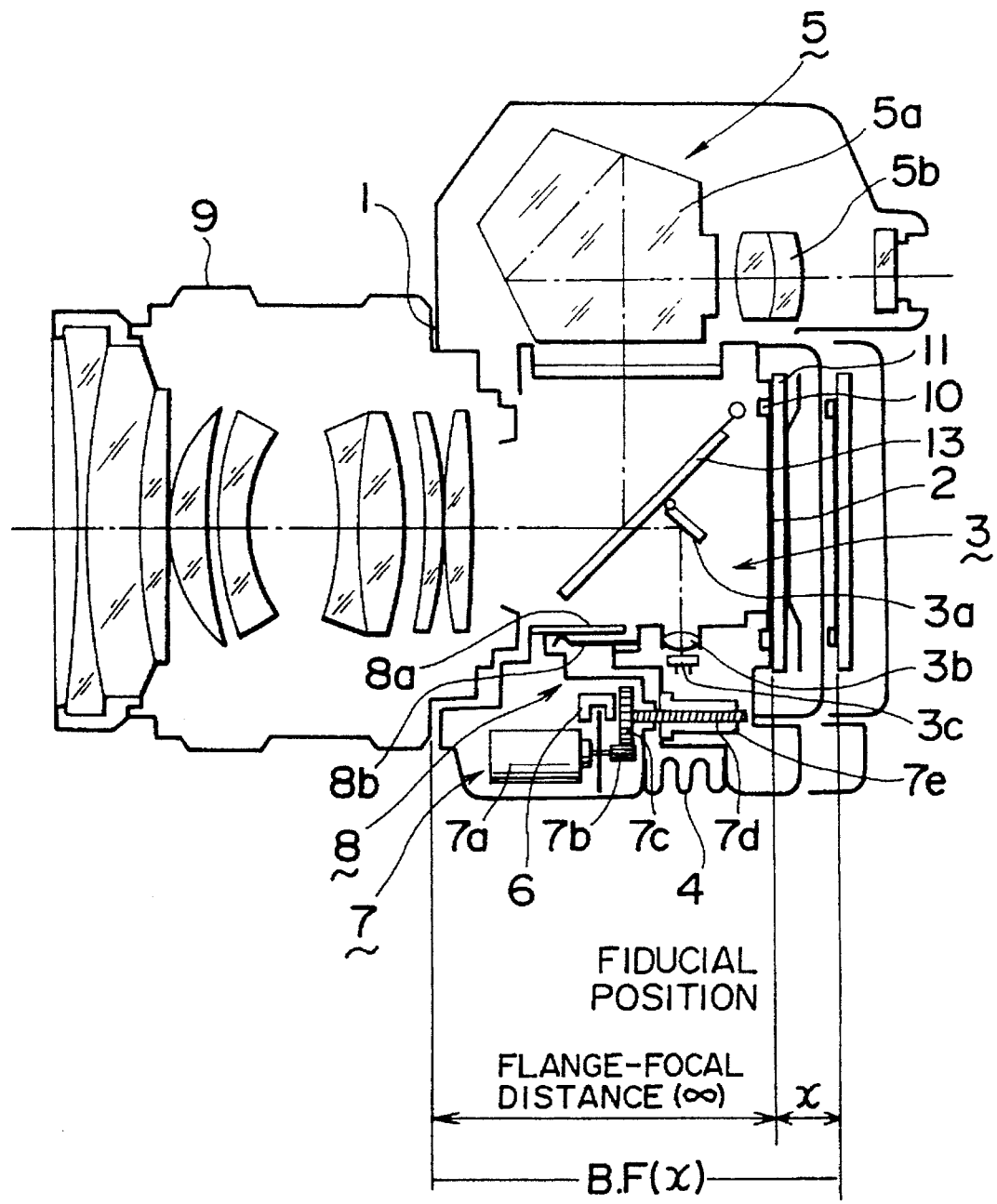
FIG. 1 is a schematic front sectional view illustrating a first embodiment of an autofocus single-lens reflex camera according to this invention.

FIG. 1 is a front sectional view schematically illustrating a first embodiment of an autofocus single-lens reflex camera according to this invention.

Figure 2A:
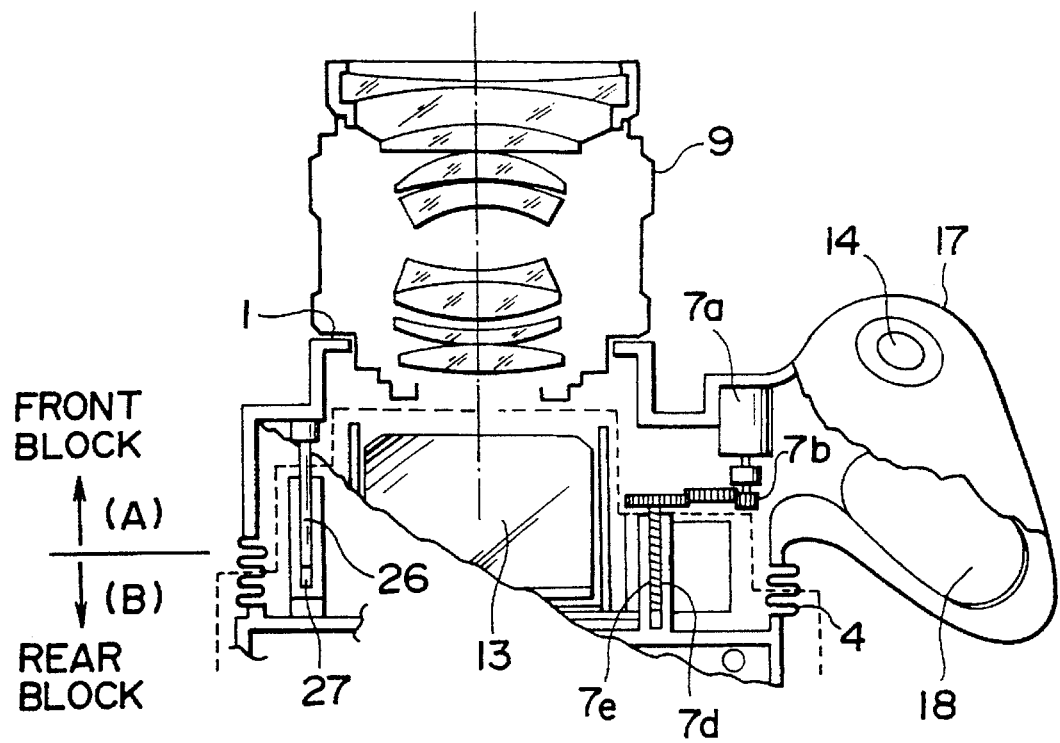
FIG. 2(a) is a fragmentary plan sectional view of assistance in fully explaining a configuration of a camera body front block of FIG. 1.
Figure 2B:
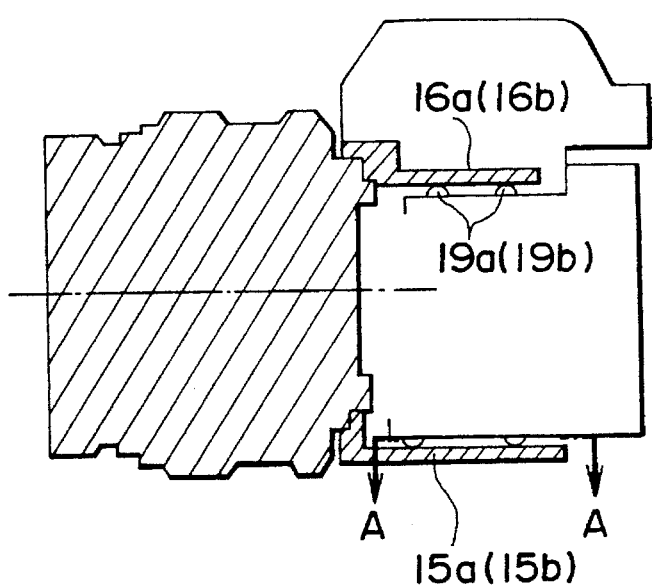
FIGS. 2(b) and 2(c) are schematic views of assistance in explaining a connection mechanism for connecting the camera body front block to a rear block.
Figure 2C:
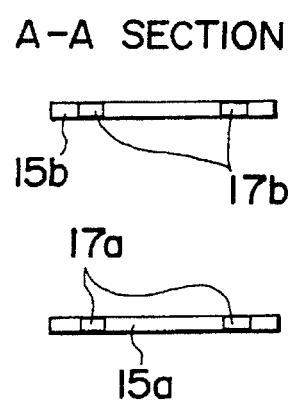

FIG. 2(a) is a fragmentary plan sectional of assistance in explaining a detailed configuration of a front block of a camera body of FIG. 1. FIGS. 2(b) and 2(c) are schematic views of assistance in explaining one example of a connection mechanism for connecting the camera body front block to a rear block in FIG. 1.

A camera body front block A defined as a fixed block comprises an interchangeable lens 9, a lens mount 1, an AF drive mechanism 7 and a grip 17 having a release button 14.

A camera body rear block B defined as a movable block comprises an up-and-down mirror 13, a finder mechanism 5, an aperture 10, an exposure mechanism, a film feed mechanism and a focus detection mechanism 3.

Beams of light from an unillustrated subject travel through the interchangeable lens 9, and an optical path thereof is guided upwards by the up-and-down mirror 13. The beams are then incident on the finder mechanism 5.

In the finder mechanism 5, the beams are guided by a pentaprism 5a and thereby turn out beams parallel to the principal optical-axis. The beams then reach an eyepiece 5b.

A part of the beams from the subject which passed through the interchangeable lens 9 also fall on an AF mirror 3a of the focus detection mechanism 3, and the optical path is guided downward. The beams come to an AF sensor 3c via an AF lens 3b.

The AF drive mechanism 7 is constructed of a flange-focal distance drive motor 7a, an encoder 76 for detecting a number of revolutions of the motor 7a, gears 7b, 7c, a lead screw 7d and a female screw 7e.

A rotational output of the flange-focal distance drive motor 7a is reduction-transferred to the lead screw 7d via the gears 7b, 7c. The lead screw 7d meshes with the female screw 7e formed in the proximal portion of the camera body rear block B. A distance in the optical-axis direction between the camera body front block A and the rear block B varies with rotations of the lead screw 7d. It is thus possible to adjust a flange-focal distance, i.e., a distance between the lens mount 1 and the aperture (opening) 10. A position where the distance between the camera body front block A and the rear block B is shortened most is a fiducial position where the lens focal point is in the infinity position. The distance is adjustable in a range from that position to a maximum×mm distance.

A position detection switch 8 is capable of detecting data indicating a positional relationship between the camera body front block A and the rear block B. A slide resistor 8a constituting the position detection switch 8 is fixed to the proximal portion of the camera body front block A. A terminal of a contact 8b is fixed to the proximal portion of the camera body rear block B. When the distance between the front block A and the rear block B changes, a resistance value of the slide resistor 8a fluctuates, correspondingly. A BF (Back-Focal distance) position detection signal is thereby obtainable. Note that the position detection switch 8 may take other methods such as detecting a code pattern.

FIG. 2 illustrates one example of a member for connecting the camera body front block A to the rear block B.

A pair of upper rails 16a, 16b and a pair of lower rails 17a, 17b are provided upwardly downwardly of the camera body front block A.

On the other hand, rollers 17a, 17b and rollers 19a, 19b are provided upwardly downwardly of the rear block B.

The rollers 17a, 17b and 19a, 19b are so constructed as to roll on the upper surfaces of the upper and lower rails 16a, 16b and 17a, 17b when the AF drive mechanism 7 operates.

Based on this construction, it is possible to smoothly change the distance between the camera body front block A and the rear block B so that a load is not applied thereon to the greatest possible degree.

Note that this connection member may involve the use of other elements such as bearings which move rectilinearly.

A guide bar 26 is provided in the camera body front block A in a position opposite to the lead screw 7d with the up-and-down mirror 13 interposed therebetween. A guide hole 27 as a member for guiding this bar is provided in the camera body rear block B.

The guide bar 26 slides within the guide hole 27 with rotations of the lead screw 7d. The guide bar 26 cooperates with the lead screw 7d to guide the camera body rear block B with respect to the camera body front block A. With this guiding action, the rear block B can be moved so as not to cause a deviation of the optical-axis between the two blocks in a state where an aperture plane and a lens mount plane keeps parallelism.

A bellows 4 is provided between the ends of the two blocks wherein a gap is formed due to fluctuations in the positional relationship, which arrangement prevents a leakage of light. Note that if constructed to incorporate the rear block B into the interior of the front block A, the rear block B moves in the optical-axis direction within the front block A. This eliminates an anxiety for the leakage of light, and, therefore, the bellows is not required to be provided between the front block A and the rear block B.

Figure 3:
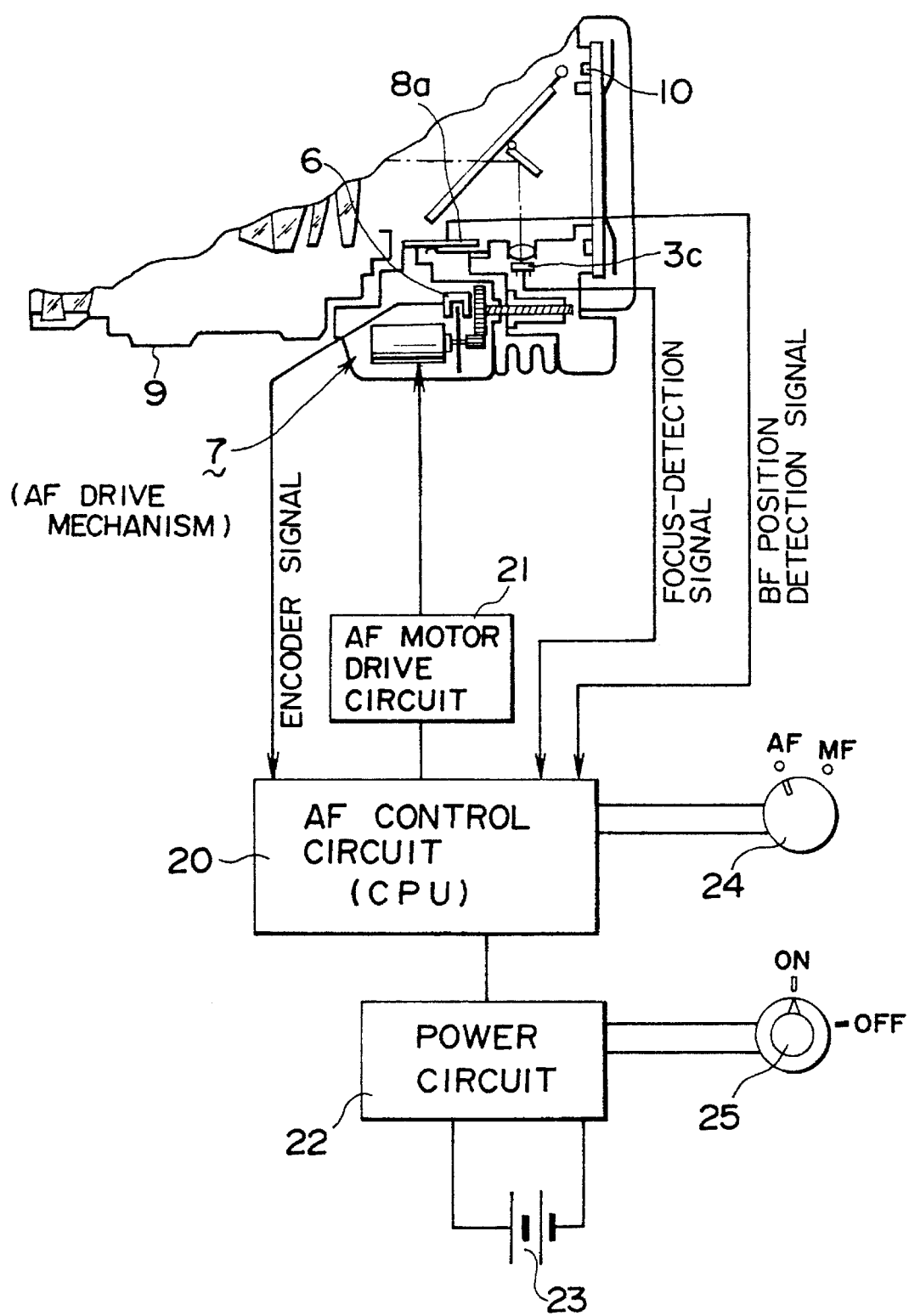
FIG. 3 is a circuit block diagram showing a configuration of a control circuit unit of FIG. 1.

FIG. 3 is a view illustrating a configuration of a control circuit of FIG. 1.

A BF position detection signal is outputted from the slide resistor 8a, while an encoder signal is outputted from the encoder 6. The AF sensor 3c outputs a focus detection signal (AF data). An AF control circuit 20 inputs this BF position detection signal, the encoder signal and the focus detection signal. Based on an indication from an AF/MF changeover switch 24 and an ON/OFF signal from a power switch 25, the AF control circuit 20 controls the AF control mechanism 7 by driving an AF motor derive circuit 21. A power circuit 22 is constructed to connect a battery 23 to the AF control circuit 20 by turning ON the power switch 25. When turning OFF the power switch 25, the power circuit 22 transmits an OFF signal to the AF control circuit 20 and cuts off the power supply after the AF control circuit 20 has performed a predetermined process.

Figure 4:
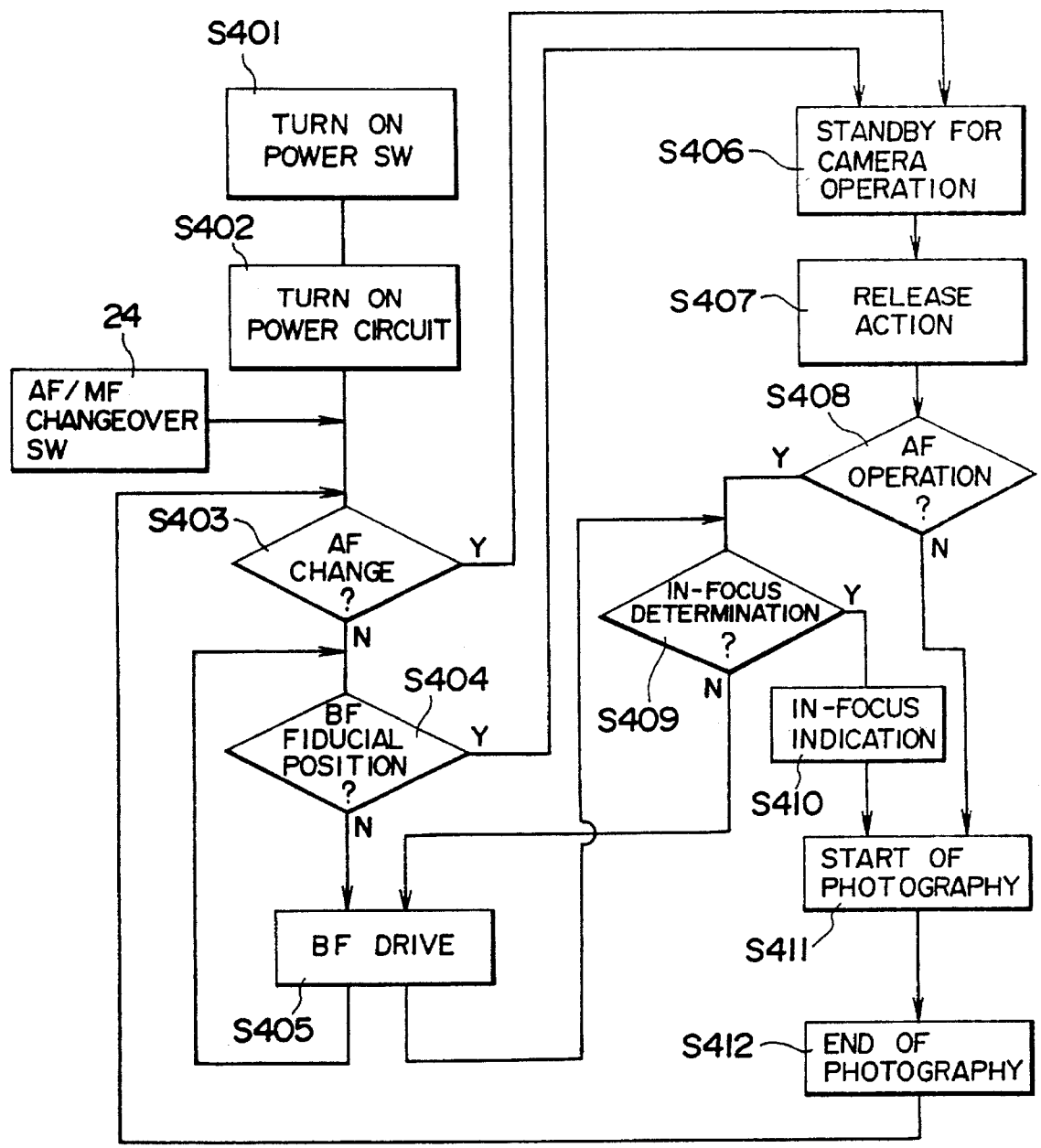
FIG. 4 is a flowchart of assistance in explaining actions relative to an AF/MF changeover switch.

FIG. 4 is a flowchart, showing the operations of the camera of FIG. 1, of assistance in explaining actions involved in a changeover by the AF/MF changeover switch.

The operation of FIG. 3 will hereinafter be explained based on this flowchart. When turning ON the power switch 25 (S401), the power circuit 22 supplies an electric energy of the battery 23 to the AF control circuit 20 and other circuits (S402). Then, AF control circuit 20 judges whether a changeover to AF mode is effected or not (S403). Herein, if the AF/MF changeover switch 24 is changed over from an AF mode to an MF mode, whether or not the rear block B is presently in the fiducial position (the infinity focal position of the interchangeable lens) with respect to the camera body front block A is determined based on the BF position detection signal (S404). If not in the fiducial position, the AF motor drive circuit 21 is controlled to drive the motor 7a, thereby moving the rear block B to the fiducial position (S405). From a determination made once again, if not set in the fiducial position, the action of S405 is repeated, thereby bringing the rear block B to the fiducial position, eventually. If initially set in the fiducial position, or if set in the fiducial position under the above drive control, the camera comes into a standby status (S406).

Further, when the AF/MF changeover switch 24 is in the AF mode, the camera is similarly brought into the standby status (S406).

Next, when the photographer performs a release action (S407), the AF control circuit 20 judges whether to perform the AF control (S408).

If in the AF mode, an in-focus determination is conducted (S409). If not in an in-focus position, the AF motor drive circuit 21 is driven to take a focalizing action (S405). Then, the in-focus determination is made again, and when not yet reachable to the in-focus position, it follows that these actions are repeated (S405, S409). When focalized, or if already in the in-focus position, an in-focus indication is given (S410), and a shutter (exposure mechanism) is operated. Photographing is thus conducted (S411).

On the other hand, if determined to be the MF mode, the shutter is operated by the release action (S411).

When finishing the photography (S412), the action returns to S403 and gets ready for the next photography.

Figure 5:
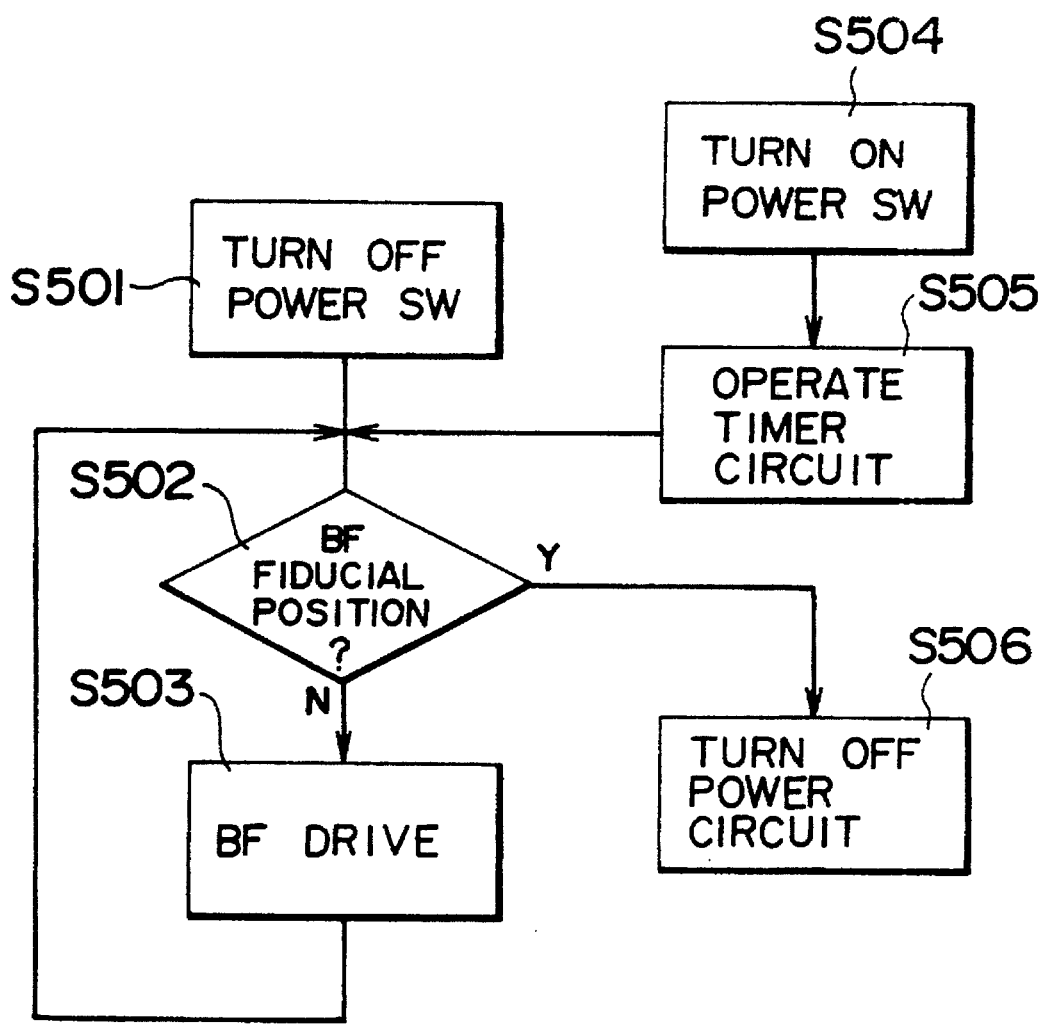
FIG. 5 is a flowchart of assistance in explaining actions when turning OFF a power switch.

FIG. 5 is a flowchart of assistance in explaining the actions relative to the operation of the power supply of the camera shown in FIG. 1.

When the power switch 25 is in the OFF-state (S501), the AF control circuit 20 judges whether or not the rear block B is in the fiducial position with respect to the camera body front block A (S502) If not in the fiducial position, the AF motor derive circuit 21 is driven to rotate the motor 7a in a direction of the fiducial position (S503). The rear block B is thus set in the fiducial position, and a signal indicating this is transmitted to the power circuit 22. The power circuit 22 receives this signal and cuts off the power supply (S506).

Further, when the power switch 25 is in the ON-state (S504), the AF control circuit 20 actuates an unillustrated timer circuit to detect that the release action is not done for a fixed period of time (S505). The timer circuit, when the release action is done within the fixed time, is rest each time and restarted.

Even after the fixed time has elapsed, no release action is conducted. In this case, a loop of actions of S502, S503 are executed, thereby setting the rear block B in the fiducial position. Thereafter, the power circuit 22 cuts off the power supply (S506).

Second Embodiment

Figure 6:
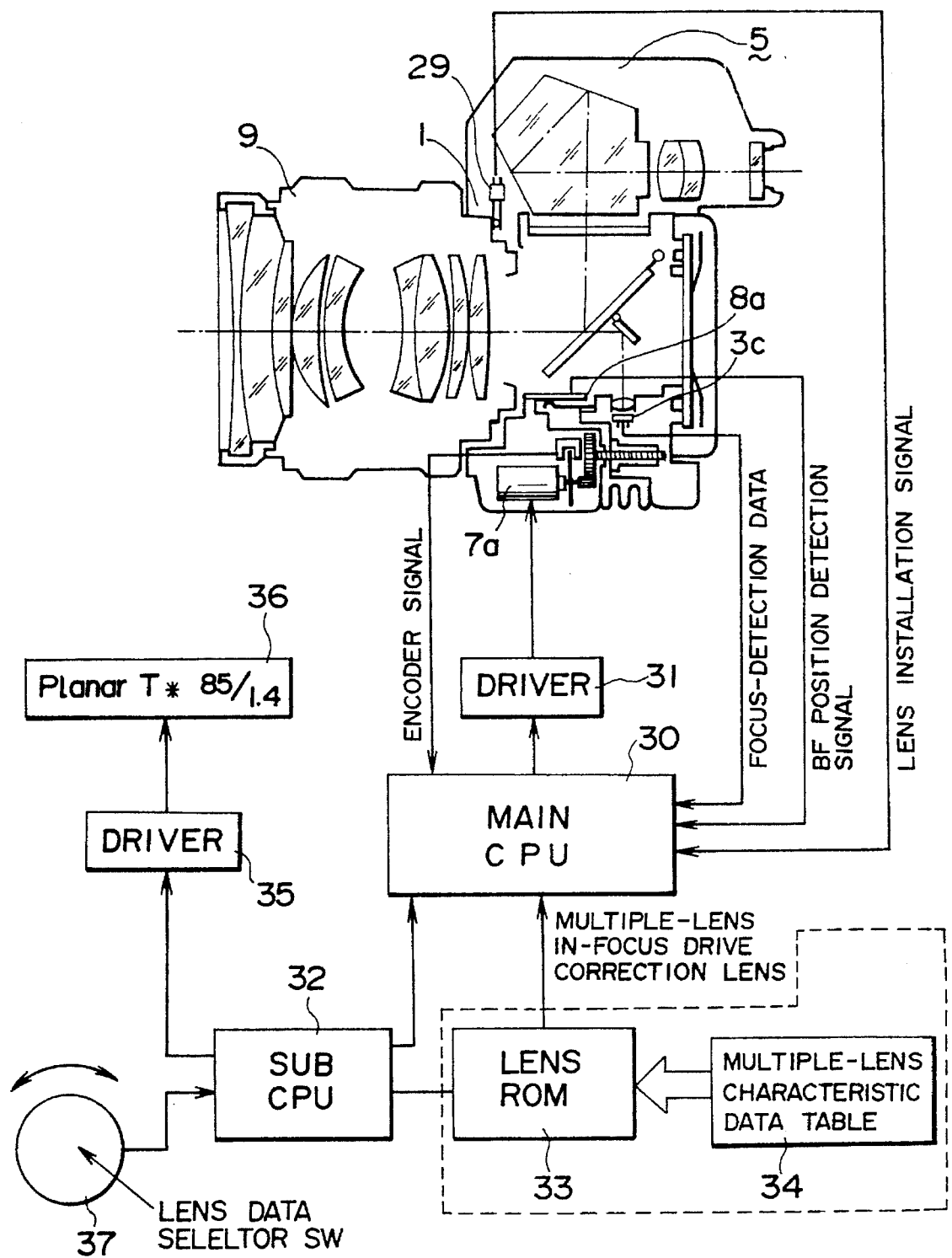
FIG. 6 is a view illustrating a second embodiment of the autofocus single-lens reflex camera according to this invention.

FIG. 6 is a front sectional view schematically illustrating a second embodiment of the autofocus single-lens reflex camera according to this invention but a circuit diagram of the control circuit.

The second embodiment presents an arrangement of quickly performing the AF operation with a high accuracy by obtaining lens data about a manual-focus lens to be mounted or other autofocus lens which is not for the exclusive use of AF. In the Figure, the mechanism units of the camera body front and rear blocks are the same as those in FIG. 1, and the same elements are therefore marked with the like symbols. A switch 29 for detecting an installation of the lens is provided in the vicinity of the lens mount 1. A main CPU 30 also serves as a function of the AF control circuit 20 of FIG. 3. Note that the AF/MF changeover switch and the power switch therefor are not shown. A lens ROM 33 stores a data table 34 of a variety of lens characteristics. The lens data are read to the main CPU 30. Connected to a sub CPU 32 is a selector switch 37 for selecting many types of lenses. Indications on a display unit 36 are controlled by lens type selection signals of the selector switch 37 through a driver 35.

FIG. 7 shows an example of the lens data table stored in the lens ROM 33.

Written therein are a shortest photographing distance $D_0$, an extension quantity $Bf(x)$, a focal length f, an inter principal plane distance $\delta$ and a focus-detection calculating correction value $\Delta k$ according to the types of the lenses. FIG. 8 illustrates on-lens positions of a variety of above distances and quantities.

When installing a certain manual lens into the lens mount, an installation signal thereof is transmitted to the main CPU 30.

When rotating the selector switch 37, the lens types stated in the Table are sequentially displayed on the display unit 36 in accordance with rotations of the selection switch 37. The photographer selects a position of the selector switch 37 which corresponds to an indication of the type of the installed lens and is thereby capable of designating the lens type. The sub CPU 32, when the lens type is designated, transmits an address of the lens type to the lens ROM 33. Data about the designated lens is read and transmitted to the main CPU 30.

The main CPU 30 corrects focus-detection data obtained from the AF sensor 3c on the basis of the lens data, thereby obtaining an accurate defocus quantity and an accurate moving quantity of the camera body rear block. The main CPU 30, when effecting the AF operation, drives the driver 31 on the basis of this data and controls the focalization.

The lens characteristics are different from each other. The differences are corrected based on the lens data stored in the form of the lens data table beforehand. It is thus feasible to calculate a highly precise in-focus position and attain a quick focalizing action.

This focalizing action is performed at the same speed as focalizing by the AF only autofocus lens on the basis of the lens ROM data.

When removing the lens installed presently, an item of data thereof is transmitted to the main CPU 30. Items of removed-lens data accumulated in the main CPU 30 are canceled. Accordingly, a malfunction does not happen unless the data table of a different lens is read due to a misdesignation of the type of an interchangeable lens.

Note that the AF operation in the case of including no table corresponding to the installed lens or setting no lens type after the photographer has installed the lens is processed base on average and standard ROM data of the various lenses, and an arithmetic process is done from the focus-detection data of the light penetrating the lens. The focalizing action is conducted at a standard speed.

In the above first and second embodiments, the discussion has been made by way of the example where the AF focus-detection mechanism and the finder mechanism are incorporated into the rear block. If the film plane, the AF sensor plane and the finder plane are set in conjunction with an optically conjugate positional relationship, however, the AF focus-detection mechanism and the finder mechanism are not necessarily mounted in the rear block.

According to the first and second embodiments discussed above, when using the manual focus lens in the back-focal distance control system autofocus single-lens reflex camera, the flange-focal distance is automatically set in the infinity position of the lens. There is no deviation in scales of a lens range ring, and manipulation can be well done. Further, when not in use, the distance between the camera body front block and the rear block is shortened most, and, therefore, a high portability is given.

Further, when effecting the AF operation by use of the manual focus lens in accordance with the second embodiment, the type of the installed lens is selected, thereby reading the lens data from the lens data Table stored beforehand in the memory. A focus-detected result by the AF sensor is corrected. The AF operation can be thus quickly accurately performed.

Third Embodiment

Figure 9:
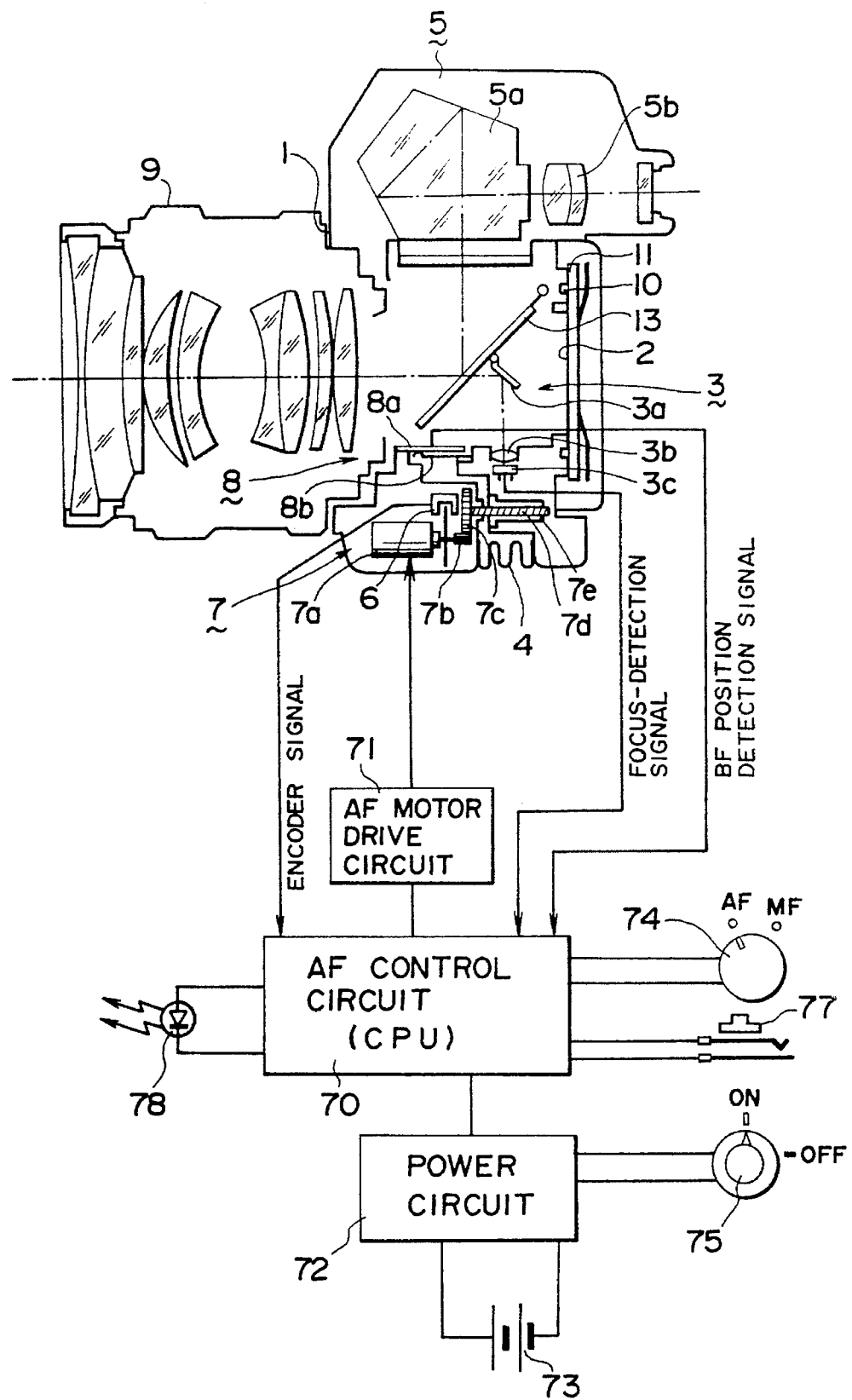
FIG. 9 is a schematic front sectional view of a close-up photographing mechanism but illustrating a third embodiment of the autofocus single-lens reflex camera according to this invention.

FIG. 9 is a view illustrating a third embodiment of the autofocus single-lens reflex camera of this invention but a front sectional view schematically showing a close-up photographing mechanism.

The configuration of the camera body front block and the connection mechanism for connecting the camera body front block to the rear block in the third embodiment are the same as those shown in FIGS. 2(a), 2(b) and 2(c). Further, the following arrangements are also the same, wherein the camera body front block is constructed of the interchangeable lens 9, the lens mount 1, the AF drive mechanism 7 and the grip 17 including the release button 14; and the camera body rear block is constructed of the up-and-down mirror 13, the finder mechanism 5, the aperture 10, the exposure mechanism the film feed mechanism and the focus detection mechanism 3.

Accordingly, the same elements as those in the first embodiment are marked with the like symbols.

The beams of light from the unillustrated subject fall on the finder mechanism 5 via the interchangeable lens 9 and the up-and-down mirror 13. The beams are guided by the pentaprism 5a and thereby turn out beams parallel to the principal optical-axis. The beams then reach the eyepiece 5b. Further, a part of the beams from the subject which passed through the interchangeable lens 9 also fall on the AF sensor 3c via the AF mirror 3a and the AF lens 3b.

Moreover, the distance in the optical-axis direction between the camera body front block and the rear block is varied depending on the construction of the AF drive mechanism 7 as well as on the AF drive mechanism 7. The distance between the lens mount 1 and the aperture (opening) 10, i.e., the flange-focal distance, can be also adjusted. This arrangement is also the same with the first embodiment.

Further, the data indicating the positional relationship between the body front block and the rear block are structured the same with the first embodiment. The arrangement that the position detection switch 8 is capable of detecting the data is also the same.

That is, when the distance between the front block and the rear block changes, the resistance value of the slide resistor 8a fluctuates, correspondingly. The BF (Back-Focal distance) position detection signal is thereby obtainable.

Next, the construction of the control circuit of FIG. 9 will be explained. The slide resistor 8a outputs the BF position detection signal. The encoder 6 outputs the encoder signal. The AF sensor 3c outputs the focus-detection signal (AF data). These signals are inputted to the AF control circuit 70. Connected to the AF control circuit 70 are an AF/MF changeover switch 74 for changing over AF and MF, a macro button (close-up photographing button) 77 and a macro photographing alarm display unit 78.

A power circuit 72 is constructed to connect a battery 73 to an AF control circuit 70 by turning ON a power switch 75. When turning OFF the power switch 75, the power circuit 72 transmits an OFF signal to the AF control circuit 70 and cuts off the power supply after the AF control circuit 70 has performed a predetermined process.

Figure 10:
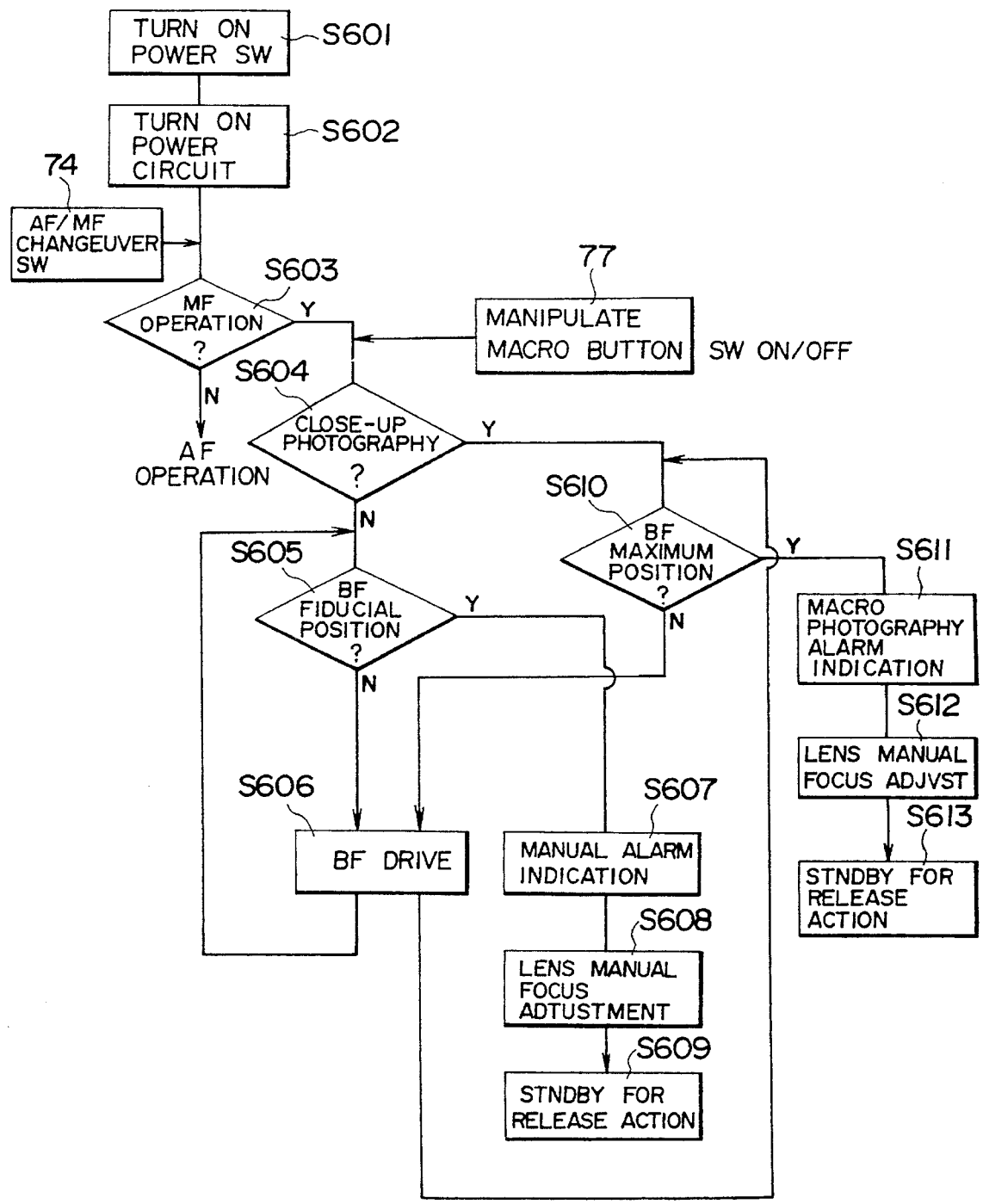
FIG. 10 is a flowchart of assistance in explaining a focusing operation of the autofocus single-lens reflex camera in the third embodiment.

FIG. 10 is a flowchart of assistance in explaining the focalization of the autofocus single-lens camera in the third embodiment of the present invention.

The operation of the camera of FIG. 9 will hereinafter be explained based on this flowchart. When turning ON the power switch 75 (S601), the power circuit 72 supplies the electric energy of the battery 73 to the AF control circuit 70 and other circuits (S602). Then, the AF control circuit 70 judges whether a changeover to the MF mode is effected or not (S603). Herein, if the AF/MF changeover switch 74 is in the AF mode, the AF operation is performed.

When changed over to the MF mode, whether or not a close-up photographing mode is set is determined by manipulating the macro button 77 (S604).

If not in the close-up photographing mode but in the normal manual photographing mode, whether or not the rear block is presently in the fiducial position (the infinity focal position of the interchangeable lens) with respect to the camera body front block A is next determined based on the BF position detection signal (S605). If not in the fiducial position, an AF motor drive circuit 71 is controlled to drive the motor 7a, thereby moving the rear block to the fiducial position (S606). Whether or not set in the fiducial position is determined once again. If set in the fiducial position, or if initially set in the fiducial position, a manual alarm indication is given (S607).

The photographer, after confirming this indication, adjusts the focus by operating the lens (S608). The camera is brought into a release operation standby status (S609).

On the other hand if in the close-up photographing mode, the AF control circuit 70 judges whether or not the distance of the rear block from the camera body front block comes to the maximum (S610). If not the maximum, the AF motor drive circuit 71 is controlled to drive the motor, thereby bringing the rear block to the maximum position (S606).

When setting the rear bloc in the maximum position, the macro photographing alarm indication is given (S611).

The photographer confirms the fact of being set in the close-up photographing mode from this indication. It follows that the photographer then performs the focus adjustment by manually operating the lens. The camera comes into the release operation standby status (S613).

Figure 11:
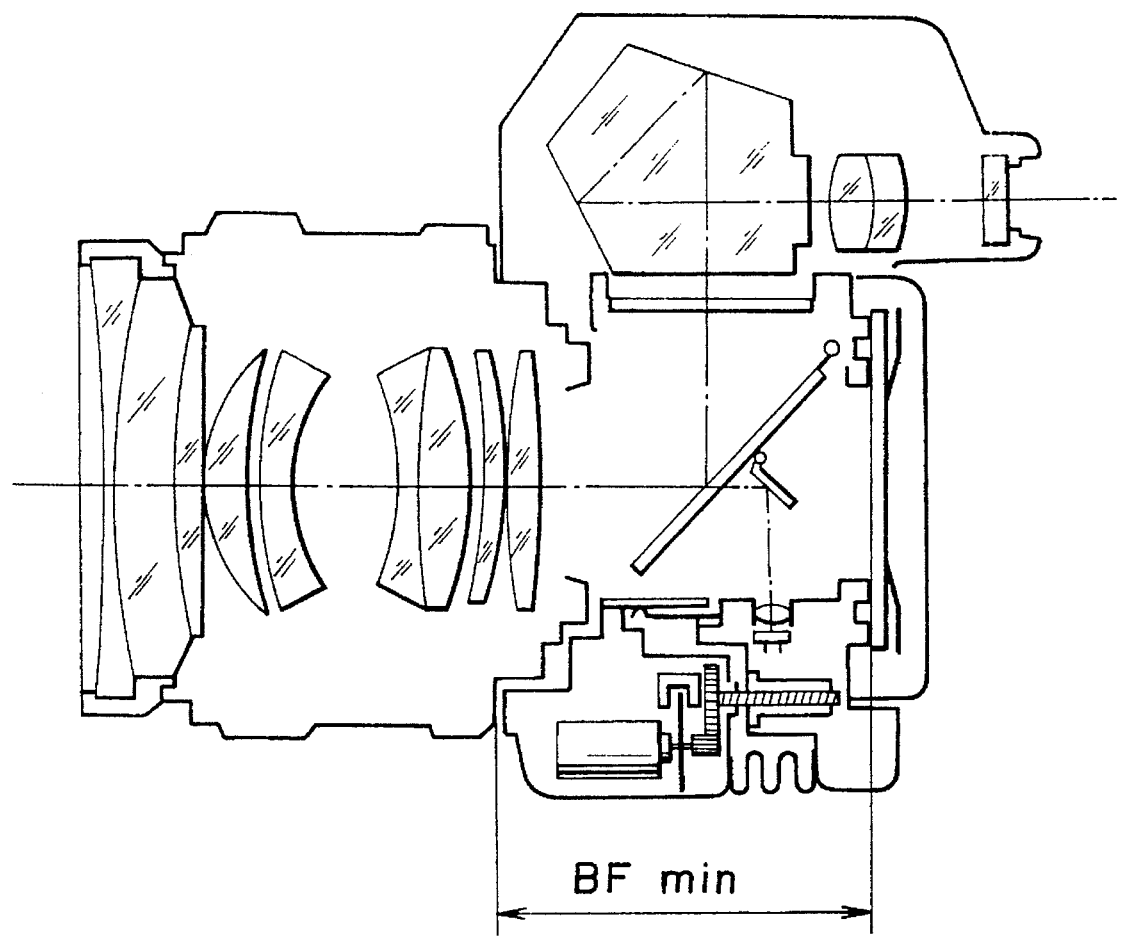
FIG. 11 is a schematic front sectional view showing a status of an ordinary manual photographic mode in the third embodiment.

FIG. 11 illustrates a state where the rear block is set in the fiducial position, i.e., the shortest position with respect to the camera body front block when switching OFF the power supply or when in the manual focus operation.

Figure 12:
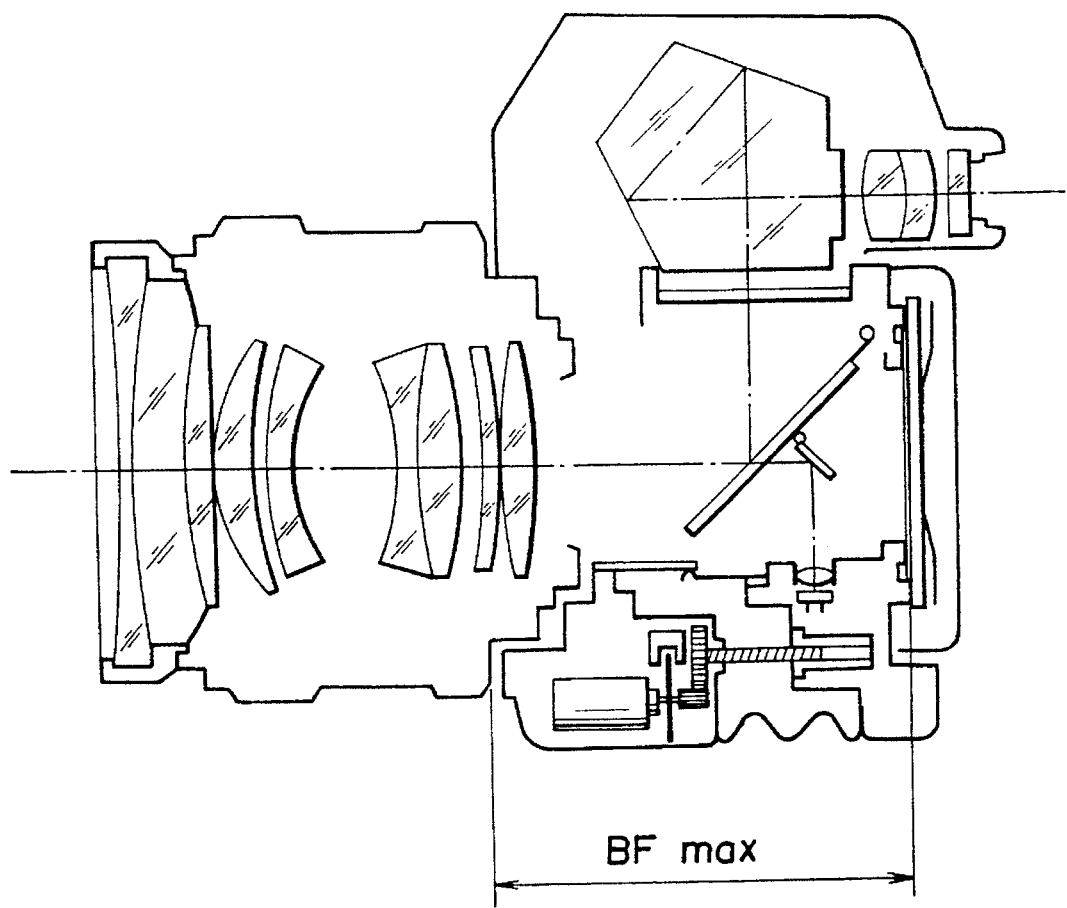
FIG. 12 is a schematic front sectional view showing a status of a close-up photographic mode when manipulating a macro button in the third embodiment.

As described above, when shifted to the close-up photographing mode, the rear block instantaneously moves to the maximum position as shown in FIG. 12 on the basis of a command of the AF control circuit 70.

Hence, the close-up photography can be conducted by thus adjusting the flange-focal distance to the possible-of-close-up position. It is also feasible to attain the close-up photography wherein the distance to the subject is still shorter than before by manipulating the lens range ring.

The third embodiment discussed above has given the example where the AF focus-detection mechanism and the finder mechanism are mounted in the rear block. If the film plane, the AF sensor plane and the finder plane are set in conjunction with the optically conjugate positional relationship, however, the AF focus-detection mechanism and the finder mechanism are not necessarily mounted in the rear block.

According to the third embodiment discussed above, in the back-focal distance control system autofocus single-lens reflex camera, the camera itself is set by one-touch in the possible-of-close-up photographing status simply by selecting the macro photographing mode. Labors for attaching and detaching the lens and the close-up ring can be saved. Further, the possible-of-close-up status can be attained with the maximum flange-focal distance. Hence, a more close-up status can be attained by manipulating the lens range ring.

Fourth Embodiment

Figure 13:
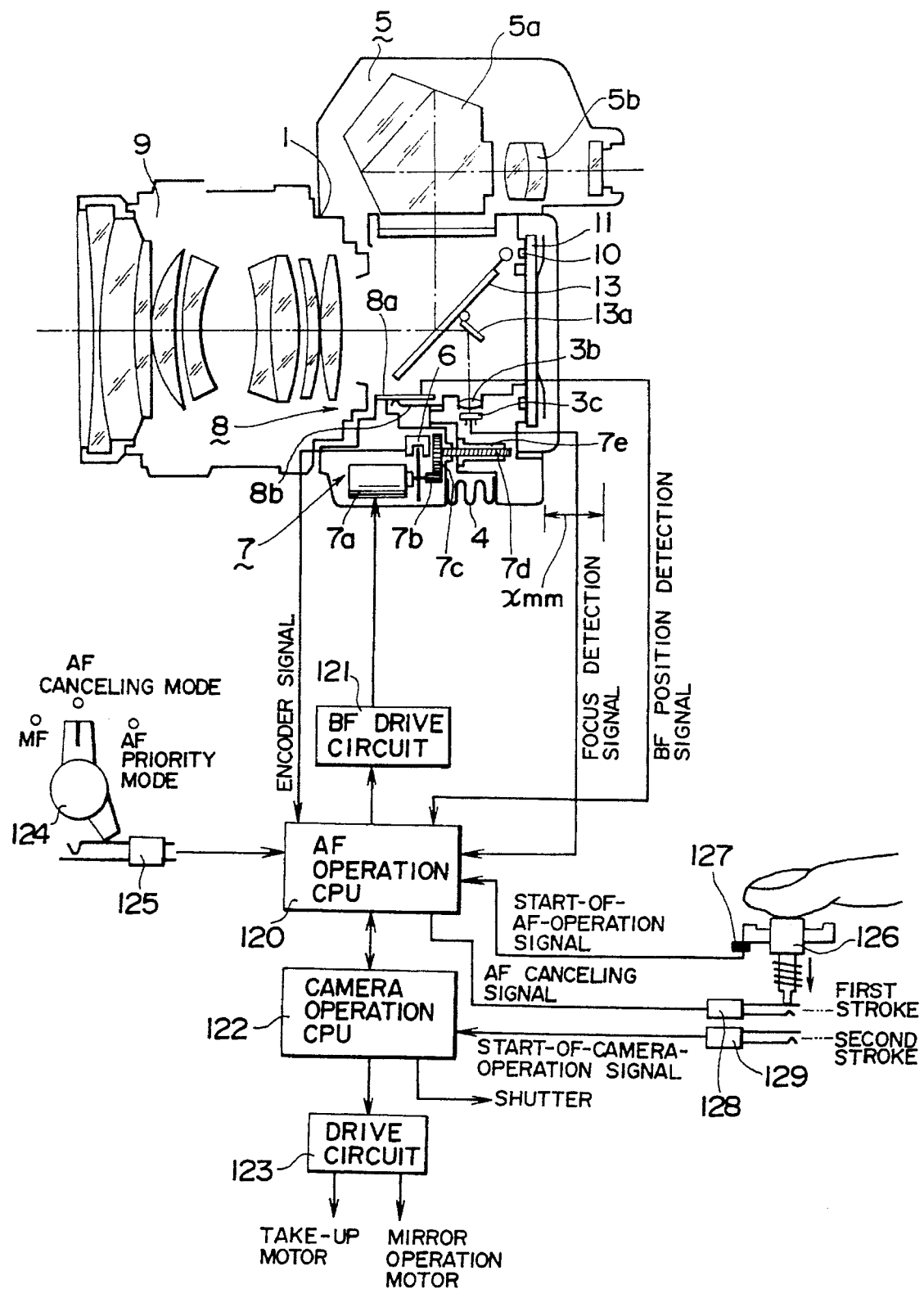
FIG. 13 is a schematic front sectional view of an AF canceling device but illustrating a fourth embodiment of the autofocus single-lens reflex camera according to this invention.

FIG. 13 is a view illustrating a fourth embodiment of the autofocus single-lens reflex camera of this invention but a front sectional view schematically showing an AF canceling device.

FIG. 13 shows an example of an application to the back-focal distance control system AF single-lens reflex camera capable of effectively using an AF canceling mode.

The configuration of the camera body front block and the connection mechanism for connecting the camera body front block to the rear block in the fourth embodiment are the same as those shown in FIGS. 2(a), 2(b) and 2(c). Further, the following arrangements are also the same, wherein the camera body front block is constructed of the interchangeable lens 9, the lens mount 1, the AF drive mechanism 7 and the grip 17 including the release button 14; and the camera body rear block is constructed of the up-and-down mirror 13, the finder mechanism 5, the aperture 10, the exposure mechanism, the film feed mechanism and the focus detection mechanism 3.

Accordingly, the same elements as those in the first embodiment are marked with the like symbols.

The beams of light from the unillustrated subject fall on the finder mechanism 5 via the interchangeable lens 9 and the up-and-down mirror 13. The beams are guided by the pentaprism 5a and thereby turn out beams parallel to the principal optical-axis. The beams then reach the eyepiece 5b. Further, a part of the beams from the subject which passed through the interchangeable lens 9 also fall on the AF sensor 3c via the AF mirror 3a and the AF lens 3b.

Moreover, the distance in the optical-axis direction between the camera body front block and the rear block is varied depending on the construction of the AF drive mechanism 7 as well as on the AF drive mechanism 7. The distance between the lens mount 1 and the aperture (opening) 10, i.e., the flange-focal distance, can be also adjusted. This arrangement is also the same with the first embodiment.

Further, the data indicating the positional relationship between the body front block and the rear block are structured the same as with the first embodiment. The arrangement that the position detection switch 8 is capable of detecting the data is also the same.

That is, when the distance between the front block and the rear block changes, the resistance value of the slide resistor 8a fluctuates, correspondingly. The BF (Back-Focal distance) position detection signal is thereby obtainable.

Next, the construction of the control circuit in the fourth embodiment will be explained. The slide resistor 8a outputs the BF position detection signal. The encoder 6 outputs the encoder signal. The AF sensor 3c outputs the focus-detection signal (AF signal). These signals are inputted to an AF operation CPU 120. The AF operation CPU 120 controls a BF drive circuit 121 to drive a drive motor 7a on the basis of the BF position detection signal, the focus-detection signal and the encoder signal when in the AF mode. The rear block is thereby moved to the in-focus position with respect to the camera body front block.

A mode switch 124 is capable of being changed over to any one of the MF mode, the AF canceling mode and an AF priority mode. The AF priority switch 125 is turned ON/OFF with a selection of the mode switch 124.

Autofocusing in this embodiment is carried out by adjusting the back-focal distance. Hence, the range ring of the interchangeable lens 9 can be arbitrarily manually adjusted in any time even by selecting, as a matter of course, the MF mode, the above AF priority mode and the AF canceling mode.

Further, A touch sensor 127 is disposed on a side surface of the head of a release button 126. The touch sensor 127 detects whether or not a finger of the photographer touches on the release button for releasing. An AF canceling switch (a first detecting element) 128 is provided in a first stroke position of the lower portion of the release button 126. A camera operation switch (a second detecting element) 129 is provided in a second stroke position thereof. When the touch sensor detects a touch of the finger, a start-of-AF-operation signal is transmitted to the AF operation CPU 120. When turning ON the AF canceling switch 128, an AF canceling signal is transmitted to the AF operation CPU 120. Further, when turning ON the camera operation switch 129, a start-of-camera-operation signal is transmitted to the camera operation CPU 122.

The camera operation CPU 122 receives an in-focus signal from the AF operation CPU 120. When the camera operation switch 129 transmits the start-of-camera-operation signal, the camera operation CPU 122 drives a mirror operation mechanism, a shutter mechanism and a take-up mechanism through the drive circuit 123 for the photography.

Figure 14:
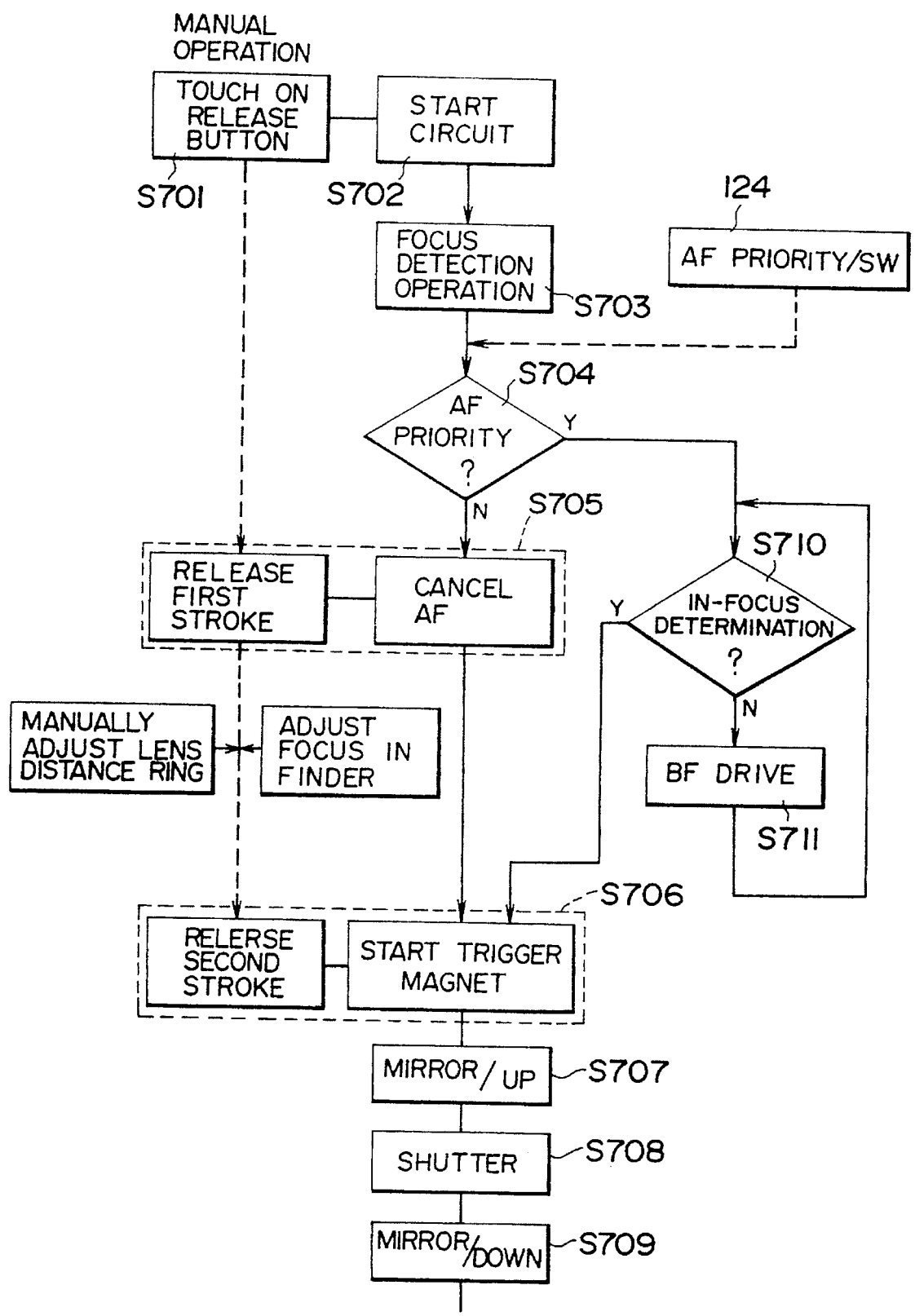
FIG. 14 is a flowchart of assistance in explaining an AF canceling mode and an AF priority mode in the fourth embodiment.

FIG. 14 is a flowchart of assistance in explaining the AF canceling mode and the AF priority mode in the fourth embodiment.

Actions in the respective modes will hereinafter be described with reference to FIG. 14. The AF operation CPU 120, when the finger of the photographer touches on the release button 126, actuates the circuit (S702). The AF operation CPU 120 subsequently detects the focus (S703) and judges whether or not the mode switch 124 is set in the AF priority mode (S704).

When determining that the mode switch 124 is set in the AF priority mode, an in-focus determination (S710) is effected. If not focalized, a moving quantity of the rear block up to the in-focus position with respect to the camera body front block is calculated based on the focus detection signal and the BF position detection signal. The BF drive circuit 121 is controlled based on this calculated value, thereby moving the rear block to the in-focus position (S711). Then, the in-focus determination is performed once again, and if not focalized, the above actions are repeated. Whereas if focalized, or if initially focalized, the data thereof is transmitted to the camera operation CPU 122.

The camera operation CPU 122 starts a trigger magnet (S706) when receiving the in-focus data and outputting the start-of-camera-operation signal from the camera operation switch 129 after the release button 126 has come to the second stroke position. With this action, the mirror flips up (S707), and the shutter operates (S708). Then, the mirror flips down (S709), and, further, the winding process is performed, thus finishing the photography.

Note that the shutter is not clicked even when the release button 126 reaches the second stroke position unless the in-focus state is attained in the AF priority mode.

On the other hand, when the mode switch 124 is initially changed over to the AF canceling mode, or when changed over to the AF canceling mode during the AF operation, an ON-signal of the AF priority switch 125 is inputted to the AF operation CPU 120. When depressing the release button 126 down to the first stroke position, the AF canceling switch 128 is turned ON, thereby outputting the AF canceling signal (S705). The changeover to the AF canceling mode is conducted if the AF operation strays, or if impossible of detecting the focus, or if the focal position is corrected or intentionally shifted.

The AF operation CPU 120, on receiving the ON-signal and the AF canceling signal from the AF priority switch 125, transmits a signal for enabling the shutter action to the camera operation CPU 120.

With this action, the camera moves to the MF mode. Then, the photographer adjusts the range ring of the interchangeable lens 9 and is thereby capable of arbitrarily selecting the focal position.

The photographer, after finishing the adjustment of the focal position, further depresses the release button 126 and thus clicks the shutter. When the release button 126 is depressed down to the second stroke position, the camera operation switch 129 outputs the start-of-camera-operation signal. The camera operation CPU 122 starts the trigger magnet (S706). The up-and-down mirror 12 rises, and the shutter mechanism operates. Then, the up-and-down mirror 13 is returned, and, at the same time, the take-up mechanism operates. The photography has been thus finished (S707, S708, S709).

The fourth embodiment discussed above has given the case of dealing with the back-focal distance control system AF single-lens reflex camera. The same advantage can be, however, obtained when applied to the AF single-lens reflex camera which performs the AF operation by adjusting the lens range ring.

According to the fourth embodiment discussed above, it is possible to provide the AF single-lens reflex camera shifting by one-touch from the AF mode to the FM mode through the simple changeover to the AF canceling mode in the AF single-lens reflex camera.

The typical AF mode is so set that the shutter operates when focusing is done in the camera. If the AF operation abnormally strays, or if impossible of detecting the focus depending on the subject, the shutter can not be clicked. Further, there are cases where the photographer corrects the focal position during the AF operation or intentionally shift the focal position. In such cases, it follows that the focal point is adjusted manually. In accordance with the fourth embodiment, however, the focal point can be manually adjusted with the smooth and quick action by effecting the changeover to the MF mode. Hence, the operation is readily separated, wherein the process incomplete through the auto mechanism is compensated by the manual mechanism, and an inconvenience in the manual mechanism is assigned to the auto mechanism. For instance, if a professional camera man does not yet have a reliability on the AF photography by the current AF single-lens reflex camera, it is possible to cover the insufficient points thereof and implement a highly sophisticated photographing technique enough to facilitate an intervention of intentions of the photographer.

Fifth Embodiment

Figure 15:
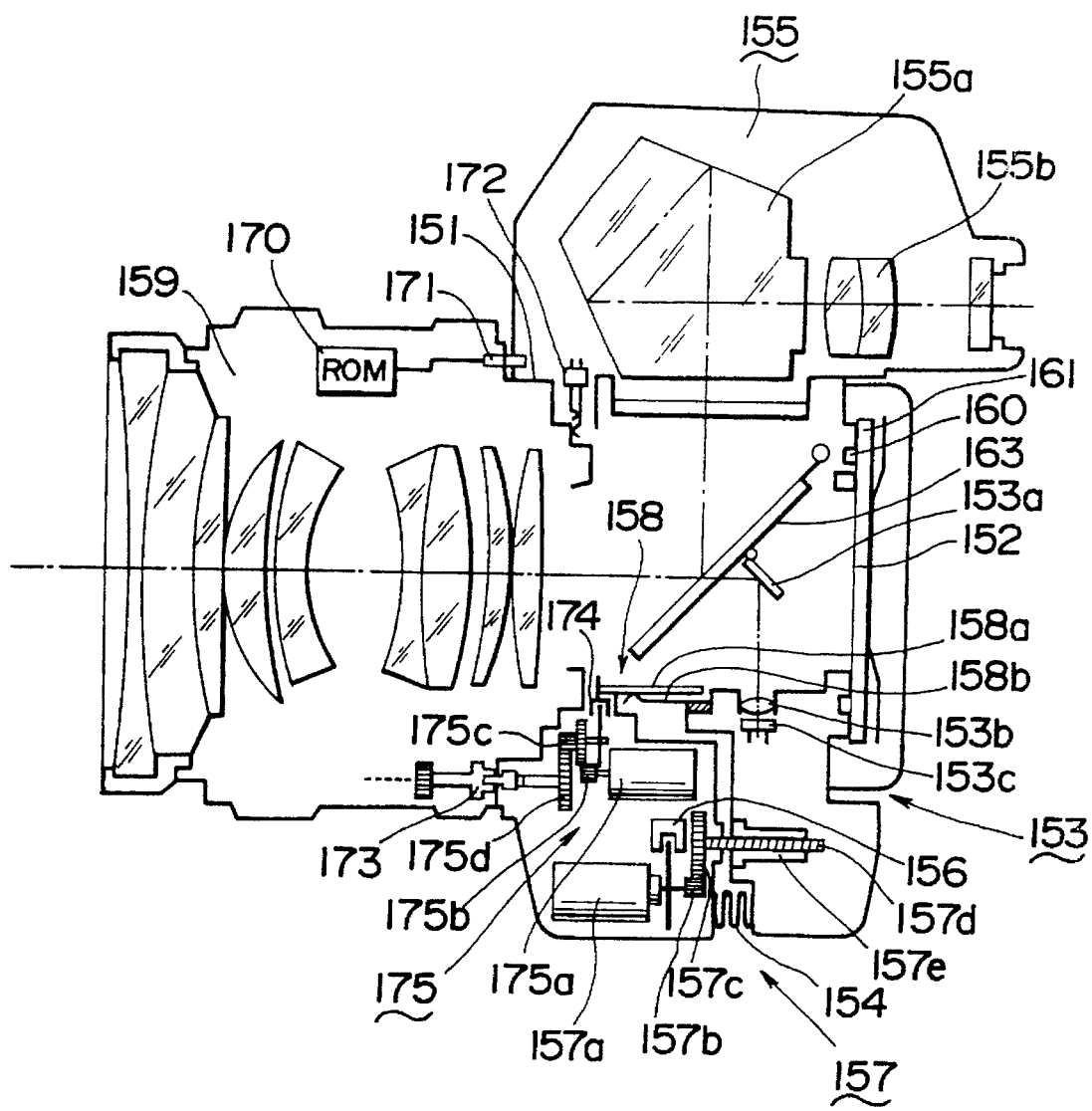
FIG. 15 is a schematic front sectional view illustrating a fifth embodiment of the autofocus single-lens reflex camera according to this invention.

FIG. 15 is a front sectional view schematically illustrating a fifth embodiment-of an autofocus single-lens reflex camera according to this invention.

Figure 16A:
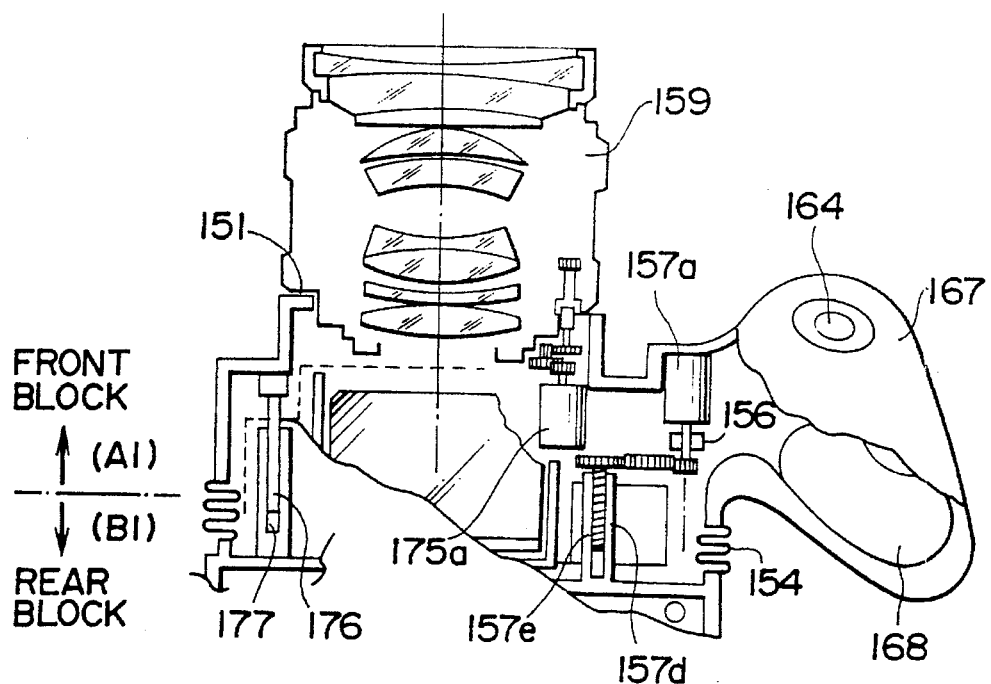
FIG. 16(a) is a fragmentary plan sectional view of assistance in fully explaining a configuration of a camera body fixed block in the fifth embodiment.
Figure 16B:
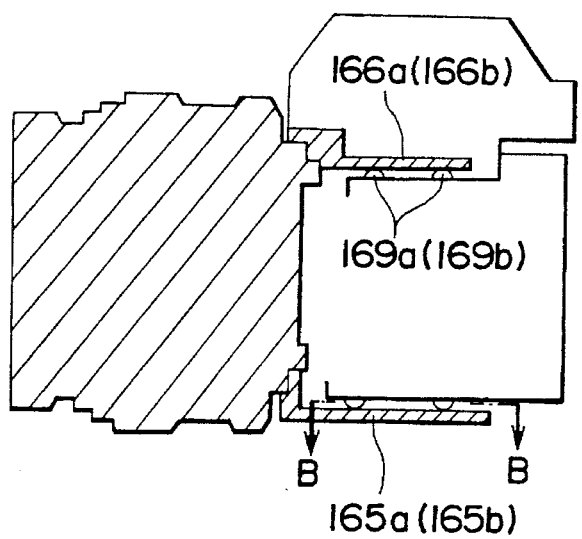
FIGS. 16(b) and 16(c) are schematic views of assistance in explaining a connection mechanism for connecting the camera body front block to the movable block in the fifth embodiment.
Figure 16C:
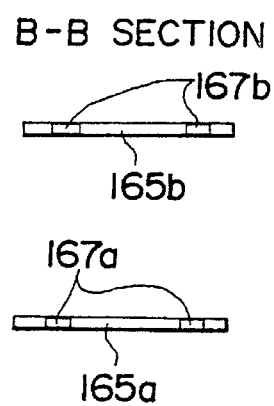

FIG. 16(a) is a fragmentary plan sectional view of assistance in explaining a detailed configuration of the camera body front block in the fifth embodiment. FIGS. 16(b) and 16(c) are schematic views of assistance in explaining the connection mechanism for connecting the camera body front block to the rear block in the fifth embodiment.

A camera body front block A1 defined as a fixed block comprises an interchangeable lens (an AF only lens is mounted in this embodiment) 159, a lens mount 151, a camera body side AF drive mechanism (a first AF drive mechanism) 157, a lens side AF drive mechanism (a second AF drive mechanism) 175 and a grip 167 having a release button 164.

A camera body rear block B1 defined as a movable block comprises an up-and-down mirror 163, a finder mechanism 155, an aperture 160, an exposure mechanism, a film feed mechanism and a focus detection mechanism 153.

Beams of light from the unillustrated subject travel through the interchangeable lens 159, and an optical path thereof is deflected upwards upon a reflection by the up-and-down mirror 163. The beams are then incident on the finder mechanism 155. In the finder mechanism 155, the beams are reflected by a pentaprism 5a and thereby turn out beams parallel to the principal optical-axis. The beams then reach an eyepiece 155b.

On the other hand, a part of the beams from the subject which passed through the interchangeable lens 159 also fall on an AF mirror 153a of the focus detection mechanism 153, and the optical path is deflected downward through a reflection. The beams are incident on an AF sensor 153c via an AF lens 153b.

An AF drive mechanism 157 on the side of the camera body is constructed of a drive motor 157a, an encoder 156 for detecting a number of revolutions of the motor 157a, gears 157b, 157c, a lead screw 157d and a female screw 157e. A rotational output of the drive motor 157a is reduction-transferred to the lead screw 157d via the gears 157b, 157c. The lead screw 157d meshes with the female screw 157e formed in the proximal portion of the camera body rear block B1. A distance in the optical-axis direction between the camera body front block A1 and the rear block B1 varies with rotations of the lead screw 7d. It is thus possible to adjust a flange-focal distance, i.e., a distance between a lens mount 151 and an aperture (opening) 160. A position where the distance between the camera body front block A1 and the rear block B1 is shortened most is a fiducial position where the lens focal point is in the infinity position. The distance is adjustable in a range from that position to a maximum× mm distance.

The AF drive mechanism 175 on the side of the lens is constructed of a lens propelling motor 175a, an encoder 174 for detecting a number of revolutions of the motor 175a, gears 175b, 175c, 175d and a lens propelling coupler 173.

A rotational output of the lens propelling motor 175a is transferred to an unillustrated focus adjusting member within the AF interchangeable lens 159 via the lens propelling coupler 173 as well as via the gears 175b, 175c. The AF interchangeable lens 159 can be thereby adjusted to the in-focus position.

An output of a ROM 170 having lens data about the AF interchangeable lens 159 is transmitted to the circuit of the camera body via a lens body communications contact 171 and used when effecting the AF operation.

A switch 172 for detecting an attachment/detachment of the lens is provided in the vicinity of the lens mount 151.

A position detection switch 158 is capable of detecting data indicating a positional relationship between the camera body front block A1 and the rear block B1. The position detection switch 158 comprises a slide resistor 158a and a contact 158b. The slide resistor 158a is fixed to the proximal portion of the camera body front block A1. A terminal of the contact 158b is fixed to the proximal portion of the camera body rear block B1. When the distance between the front block A1 and the rear block B1 changes, a resistance value of the slide resistor 158a fluctuates, correspondingly. A BF (Back-Focal distance) position detection signal is thereby obtainable. The position detection switch 158 may involve the use of elements, other than the slide resistor, for detecting the position from, e.g., a code pattern.

FIG. 16 illustrates one example of a member for connecting the camera body front block A1 to the rear block B1 in the fifth embodiment.

A pair of upper rails 166a, 166b and a pair of lower rails 165a, 165b are provided upwardly downwardly of the camera body front block A1. Rollers 167a, 167b and rollers 169a, 169b are provided upwardly downwardly of the rear block B1. The rollers 167a, 167b and 169a, 169b roll on the upper and lower rails 166a, 166b and 165a, 165b with a movement of the rear block B1. The load caused when the rear block B1 moves is thereby relieved enough to provide a smooth motion.

Note that this connection member may involve the use of other elements such as bearings which move rectilinearly.

Further, a guide bar 176 is provided in the camera body front block A1 in a position opposite to a lead screw 157d with the up-and-down mirror 163 interposed therebetween. A guide hole 177 as a member for guiding this bar is provided in the camera body rear block B1. The guide bar 176 slides within the guide hole 177 with rotations of the lead screw 157d. The guide bar 176 cooperates with the lead screw 157d to guide the camera body rear block B1 with respect to the camera body front block A1. With this guiding action, the rear block can be moved so as not to cause a deviation of the optical-axis between the two blocks in a state where an aperture plane and a lens mount plane keeps parallelism.

A bellows 154 is provided between the ends of the two blocks wherein a gap is formed due to fluctuations in the positional relationship, which arrangement prevents a leakage of light. Note that if constructed to move the camera body rear block B1 back and forth in a dark box of the camera body front block A1, the bellows is not required to be provided.

Next, the construction of the control circuit will be explained with reference to FIG. 17.

A BF position detection signal is outputted from the slide resistor 158a, while a lens control encoder signal is outputted from the lens propelling encoder 174. The movable unit drive encoder 156 outputs a BF control encoder signal, and the AF sensor 153c outputs an AF signal. These signals are inputted to an AF CPU 177. The lens propelling motor drive circuit 179 drives the lens side AF drive mechanism 175 on the basis of an indication of the AF CPU 177. Further, the BF drive motor drive circuit 179 similarly drives the camera body side AF drive mechanism 157 on the basis of an indication of the AF CPU 177. The lens body communications contact 171 and the lens attachment/detachment switch 172 are connected to the AF CPU 177. A lens attachment/detachment signal is inputted from the lens attachment/detachment switch 172. If the interchangeable lens 159 is an AF only lens, a lens ROM signal is inputted from the lens data ROM 170 via the lens body communications contact 171. Connected further to the AF CPU 177 is a simultaneous operation selection switch 185 for selecting a simultaneous drive of the lens side AF drive mechanism 175 and the camera body side AF drive mechanism 157.

An AF operation switch 182 and a start-of-photography switch 183 are disposed downwardly of the release button 181. The AF operation switch 182 is turned ON by half-depressing the release switch 181, thereby transmitting a start-of-AF-operation signal to the AF CPU 177. When further depressing the release button, a start-of-photography switch 183 is turned ON, thereby transmitting a start-of-photography signal to a camera operation CPU 180.

The camera operation CPU 180 operates the shutter mechanism and other mechanisms on receiving an item of in-focus data and the start-of-photography signal from the AF CPU 177.

Figure 17:
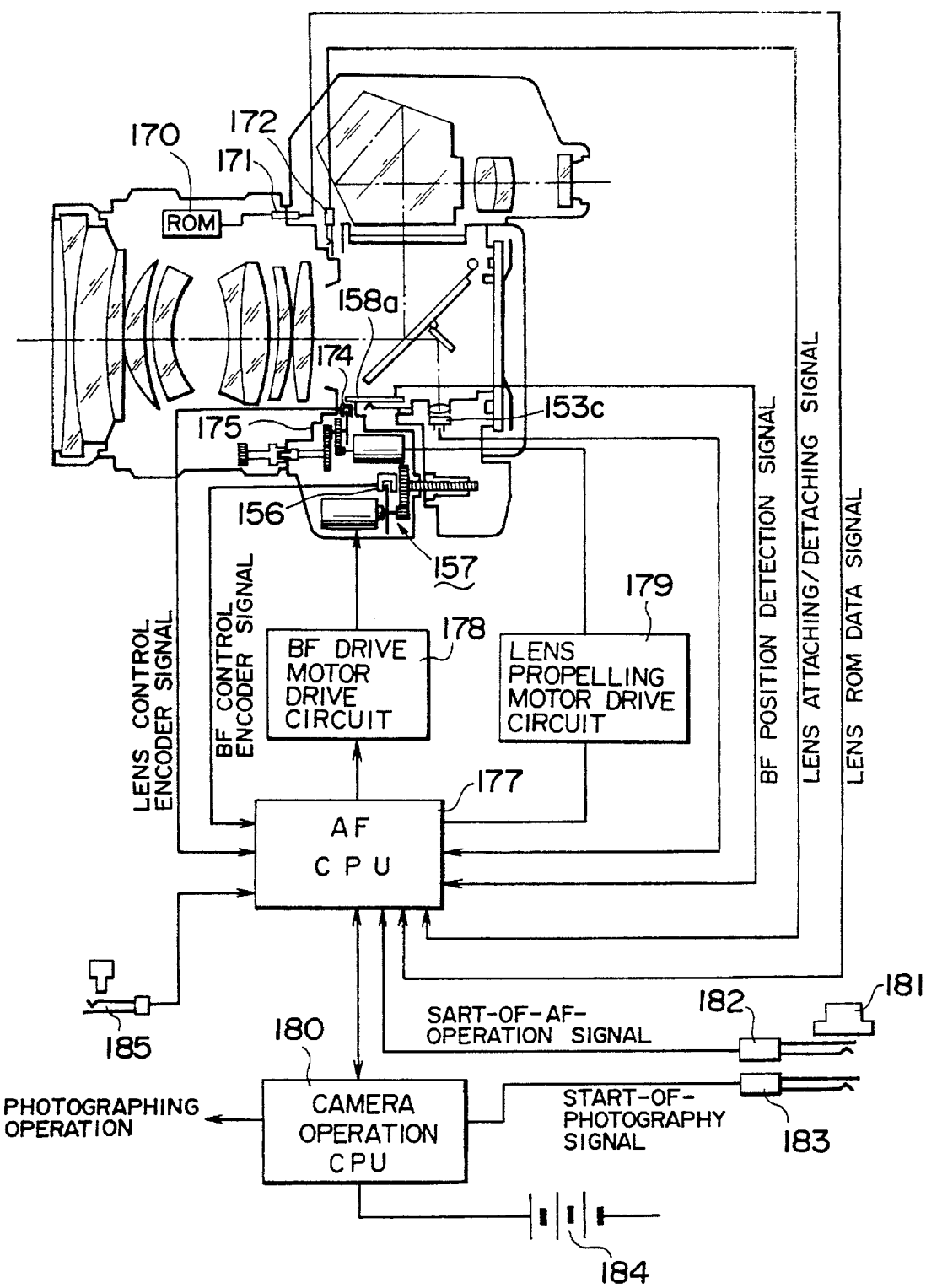
FIG. 17 is a circuit diagram showing an embodiment of a control circuit of the camera of FIG. 15.
Figure 18:
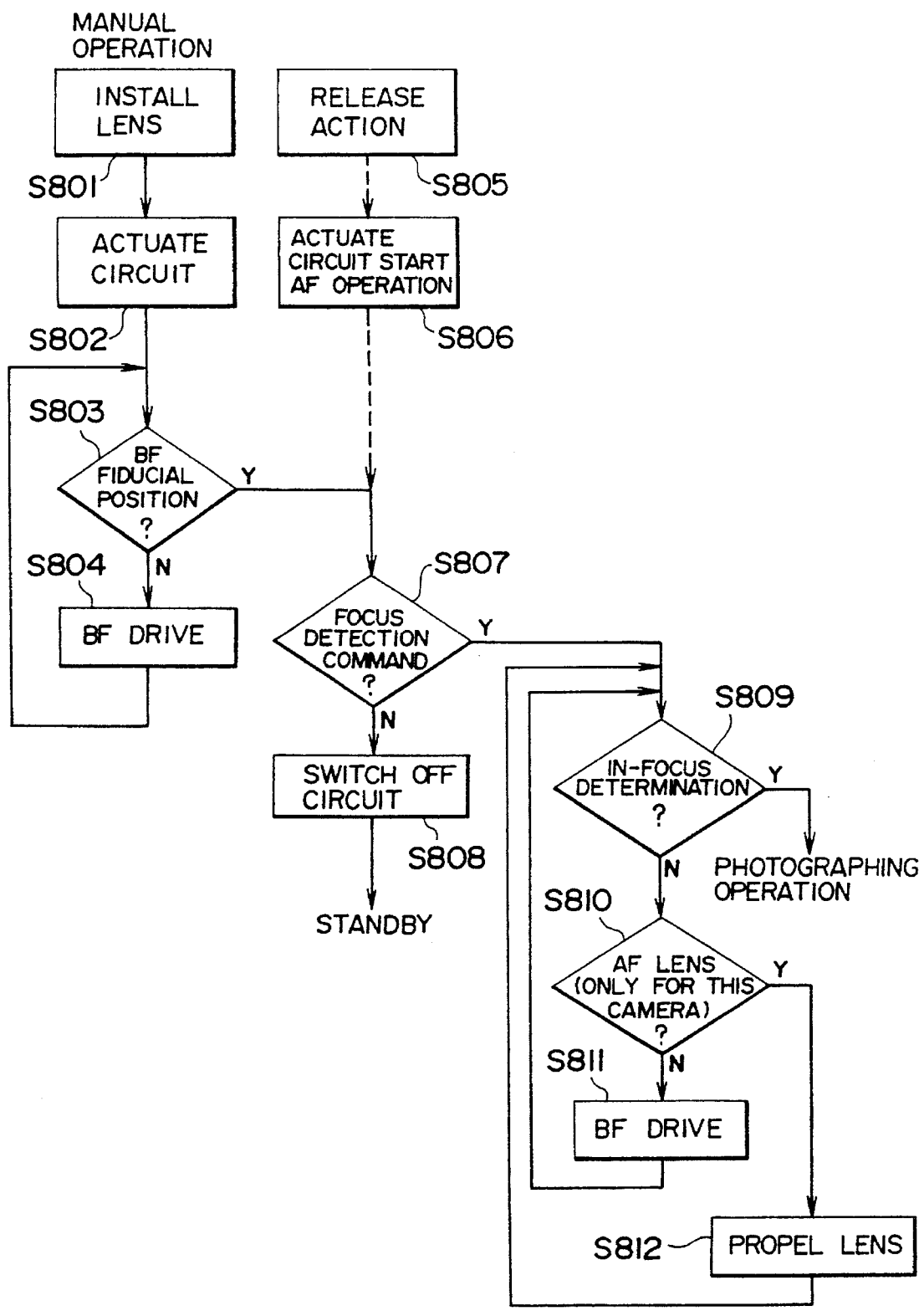
FIG. 18 is a flowchart of assistance in explaining an AF operation based on the control circuit of FIG. 17.

FIG. 18 is a flowchart of assistance in explaining actions ranging from attaching the lens to photographing in the control circuit of FIG. 17.

When installing the interchangeable lens (S801), a signal thereof is transmitted to the AF CPU 177, whereby the circuit is started (S802). The AF CPU 177 detects the BF position detection signal and thereby judges whether or not the rear block B1 is located at the infinity focal length (fiducial position) (S803). If not located at the infinity focal length, the rear block B1 is moved to the fiducial position by controlling the BF drive motor drive circuit 178 (S804). Whether in the fiducial position or not is again determined, and when not yet reachable to the fiducial position, the above control is repeatedly executed.

The following is the reason of being set to the fiducial position in advance of the AF operation. It is because the absolute condition is that the flange-focal distance is in the fiducial position in the case of adjusting the focal point by propelling the lens. The AF CPU 177 determines that the rear block B1 exists in the fiducial position, and, next, the release action is effected (S805). The AF operation switch 182 outputs the start-of-AF-operation signal (S806). The AF CPU 177 then judges whether or not a command of focus detection is given (S807). When outputting no command of focus detection without performing the release action, the electric current of the circuit is cut off, and the camera comes into the standby status (S808).

If the command of focus detection is outputted, the in-focus determination is done next (S809). If in the in-focus state, the start-of-photography switch 183 is turned ON by further depressing the release button 181 to output the start-of-photography signal. The shutter mechanism is thereby operated, and the photography can be thus conducted.

The AF CPU 177, if not in the in-focus state, judges whether or not the AF only lens is installed (S810). Herein, if the AF only lens is installed, the lens ROM data is outputted. Hence, a defocus quantity is calculated based on this ROM data. The lens is moved to the in-focus position by controlling the lens propelling motor drive circuit 179 (S812). If focalized, a possible-of-photography status is attained. Whereas if not focalized, the lens propelling motor drive circuit 179 is again driven.

On the other hand, if the lens is not the AF only lens but is, i.e., a manual focus adjusting type lens, no lens ROM data is outputted. It is therefore possible to make a determination of being the manual focus adjusting type lens. In such a case, the AF CPU 177 controls the BF drive motor drive circuit 178 (S812), and the in-focus operation is performed by moving the rear block B1. When focalized by repeating this action, the possible-of-photography status is obtained.

Given next is an explanation of how the AF operation is performed more quickly. The photographer is, when installing the AF only lens, capable of selecting a high-speed AF operation by turning ON the simultaneous operation selection switch 185. In the case of receiving the simultaneous operation signal form the simultaneous operation selection switch 185, the AF CPU 177, if not focalized as a result of making the in-focus determination in step S809, simultaneously drive-controls the lens side AF drive mechanism 175 and the camera body side AF drive mechanism. That is, the lens propelling motor drive circuit 179 and the BF drive motor drive circuit 178 are controlled to take charge of a half of the moving quantity each and then move, this quantity corresponding to the defocus quantity calculated based on the lens ROM data. With this control, it is possible to perform the AF operation faster than in the case of being driven only by the lens side AF drive mechanism 175.

FIG. 19 is a circuit diagram showing another embodiment of the control circuit of the camera of FIG. 15. Referring to FIG. 19, the circuit elements marked with the same symbols as those in FIG. 17 are the same functional elements, and the camera body mechanism units are omitted. The circuit in this embodiment omits the simultaneous operation selection switch 185 from the circuit of FIG. 17 but is provided with a serial AF operation mode selection switch 186 and a BFD mode selection switch 187. An AF CPU 188 incorporates a control function through each mode selection.

A serial AF operation mode is a mode of shooting a subject much closer than the close-range limit of the AF only lens to be installed.

Further, a BFD mode is a mode selected when determining that a focusing accuracy and an image performance are better under AF control by BF-driving the AF only lens installed than by AF-driving the same lens.

Figure 20:
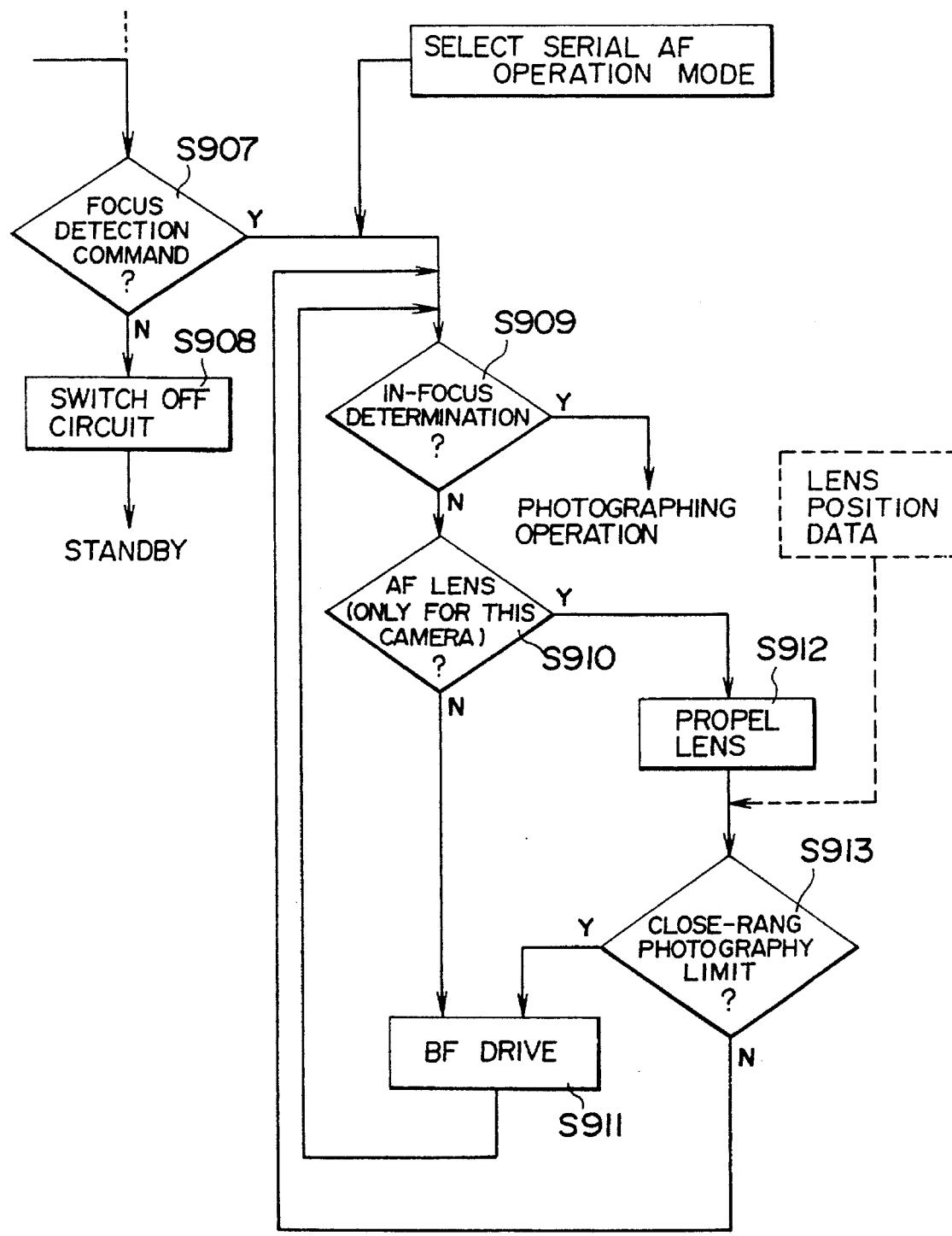
FIG. 20 is a flowchart of assistance in explaining actions when selecting a serial AF operation mode in FIG. 19.

FIG. 20 is a flowchart of assistance in explaining the operation when selecting the serial AF operation mode in FIG. 19.

In FIG. 20, a sequence of actions up to step S908 is the same as the sequence up to S808 in the flowchart of FIG. 18.

The AF CPU 188 issues a focus-detection command interlocking with a manipulation of the release button 181 (S907) and makes an in-focus determination (S909). If focalized, the action moves to the photographing process. Whereas if not focalized, the AF CPU 188 judges whether or not the installed lens is an AF only lens (S910). In the case of being the AF only lens, the control is implemented to drive the lens propelling motor drive circuit 179 to move the lens to the in-focus position (S912). With this action, the AF CPU 188 judges whether or not the lens position comes to the close-range photographing limit by obtaining the lens position data given from the lens (S913). If the in-focus determination can be made within this photographing limit, the AF operation is completed only by propelling the lens.

On the other hand, when making a determination of coming to the close-range photographing limit, the body rear block is moved by effecting a changeover to the BF operation, and the back-focal distance is varied. The focalization is thus conducted (S911).

In the typical AF camera of the prior art, if over the close-range photographing limit, an impossible-of-focusing status is displayed, and the action thus stops. In the serial AF operation mode according to this invention, however, it is possible to perform the AF photography in a wide photographic range up to a close-up position which could not be obtained so far by the AF single-lens reflex camera using the AF only lens.

Figure 21:
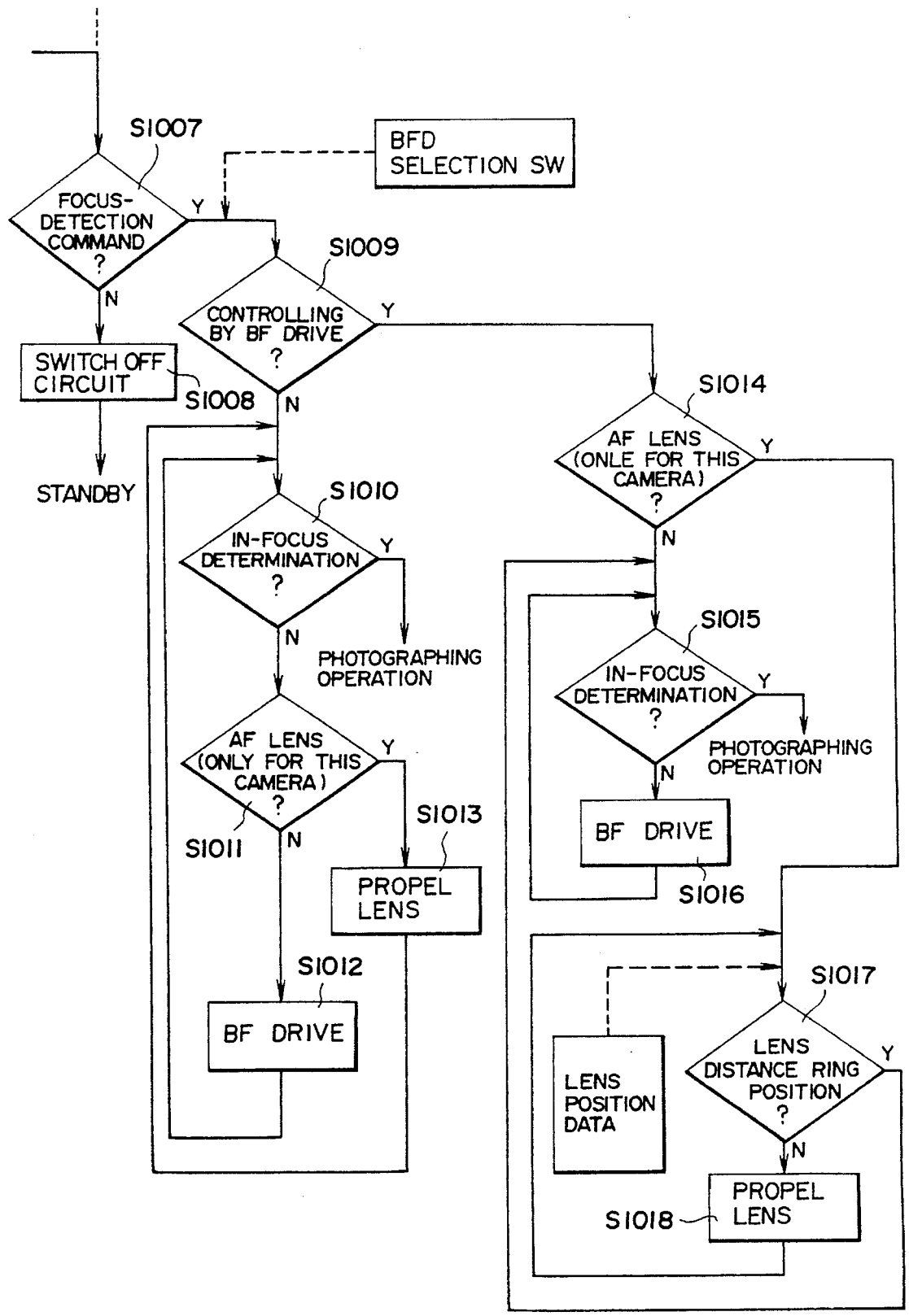
FIG. 21 is a flowchart of assistance in explaining actions when selecting a BFD mode in FIG. 19.

FIG. 21 is a flowchart of assistance in explaining actions when selecting a BFD mode in FIG. 19.

Referring to FIG. 21, a sequence of actions up to step S1008 is the same as the sequence up to S808 in the flowchart of FIG. 18.

The AF CPU 188 issues the focus-detection command in conjunction with the manipulation of the release button 181 (S1007). The AF CPU 188 then judges whether or not the photographer requests the control of the AF operation by the BF drive through the BFD mode selection switch 187 (S1009). When requesting no control by the BF drive, the control in the same sequence from S809 to S812 of FIG. 18 is conducted through a sequence from S1010 to S1012. When request to the control by the BF drive, the AF CPU 188 judges whether or not the installed lens is the AF only lens (S1014). If judged not to be the AF only lens, the in-focus determination is performed (S1015). If focalized, the action moves to the photographing operation. If not focalized, the lens is controlled to be set in the in-focus position by driving the BF drive motor drive circuit 178 (S1016)

On the other hand, if judged to be the AF only lens, though conceived as the AF only lens, there is, it is assumed, a request for the AF control by the BF drive. Then, the AF CPU 188 judges whether or not the lens range ring is set in the infinity position from the lens position data (S1017). If the lens range ring is not set in the infinity position, the range ring is moved to the infinity position by driving the lens propelling motor drive circuit 179 (S1018). In a state where the range ring is set in the infinity position, the action next returns to S1015, wherein the in-focus determination is conducted. The AF operation by the BF drive is then carried out (S1016).

In general, the great majority of AF only lenses adopt a so-called inner-focusing system or a rear-focusing system as a focus adjusting system. In this system, some image performance is sacrificed as compared with the whole lens group moving system. The lens is the AF only lens for focusing by propelling the lens, and, nevertheless, better focusing accuracy and image performance are obtained by focusing through the whole lens group movement than the former.

The BFD mode is selected in such a case.

The fifth embodiment discussed above has dealt with the example where the rear block B1 incorporates the AF focus-detection mechanism and the finder mechanism. If the film plane, the AF sensor plane and the finder plane are set in conjunction with an optically conjugate positional relationship, however, the AF focus-detection mechanism and the finder mechanism are not necessarily mounted in the rear block.

Note that a measured weight and a measured torque of the lens are larger than prescribed values, the AF drive mechanism based on the BF drive may be employed, and whereas if smaller than these values, the AF drive mechanism by propelling the lens may also be employed.

According to the above-described fifth embodiment, the lens mount is commonized. When installing the manual focus adjusting system lens, the first AF drive mechanism is selected. When installing the AF only lens, the second AF drive mechanism is selected. The AF operation can be performed for both of the manual adjusting system lens and the AF only lens.

Further, in the case of using the AF only lens, the simultaneous drive of the first and second AF drive mechanisms is selected, thereby attaining the much faster AF operation.

Moreover, when the close-range photographing limit is reached with the second AF drive mechanism in the case of installing the AF only lens, the AF operation at a much closer distance can be conducted by effecting the changeover to the BF drive defined as the first AF drive. The AF photography in a wider range can be attained than by the AF single-lens reflex camera using the conventional AF only lens.

In addition, when installing the AF only lens, the AF photography exhibiting a better focusing accuracy and a better image performance can be also by the AF operation based on the BF drive than by the AF operation based on propelling of the AF only lens.

Accordingly, the AF control can be done by use of, as a matter of course, the AF only lens and even any kinds of conventional lenses. Besides, it is possible to provide the general-purpose AF single-lens reflex camera capable of obtaining the high-performance image exhibiting the high focusing accuracy in the photography by propelling the AF only lens at the high speed in the widened close-up photographic range.

Sixth Embodiment

Figure 22:
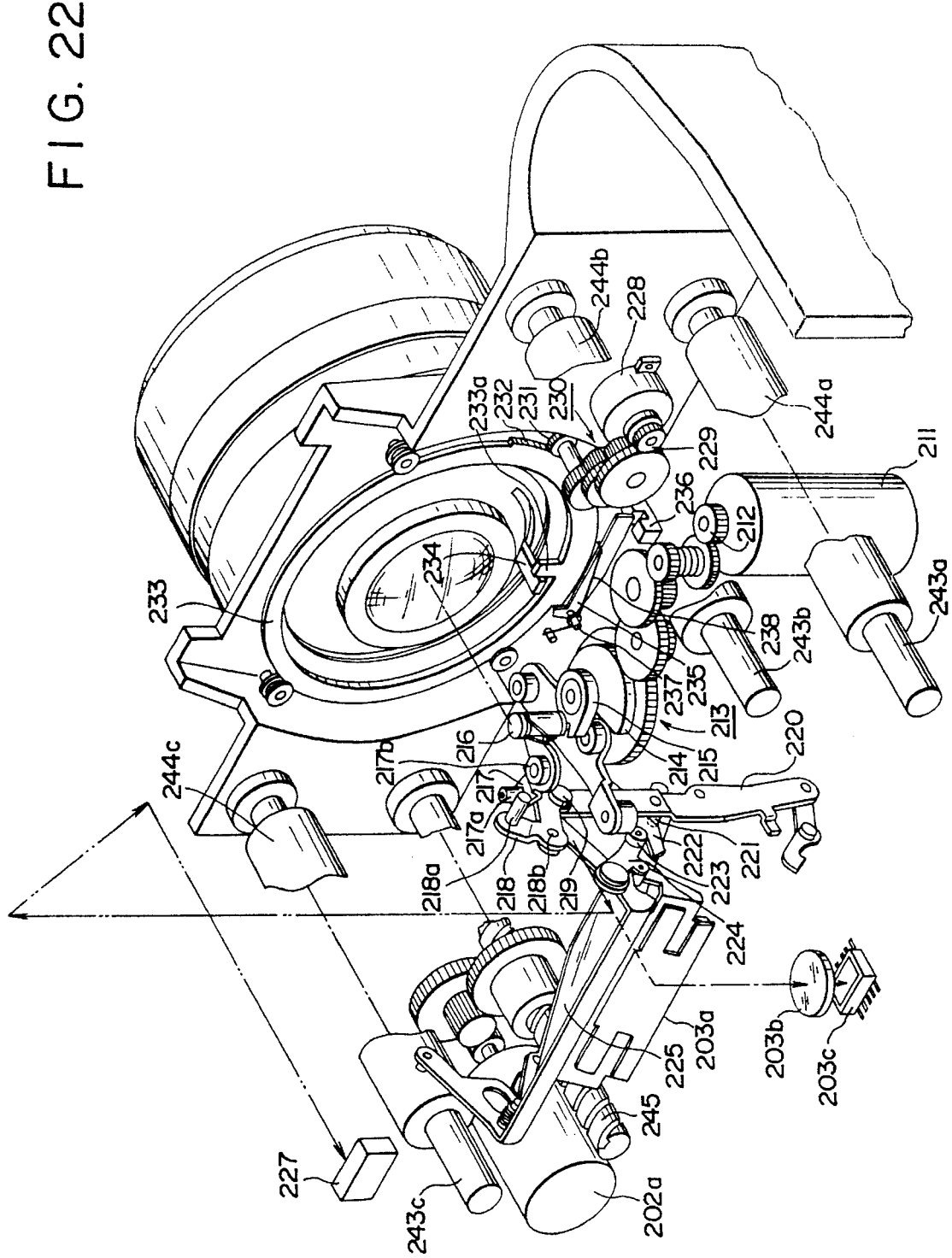
FIG. 22 is a schematic perspective view of an internal structure of the camera but illustrating a sixth embodiment of the autofocus single-lens reflex camera according to this invention.

FIG. 22 illustrates a sixth embodiment of the autofocus single-lens reflex camera according to this invention but is a schematic perspective view showing an internal structure of the camera.

Figure 24:
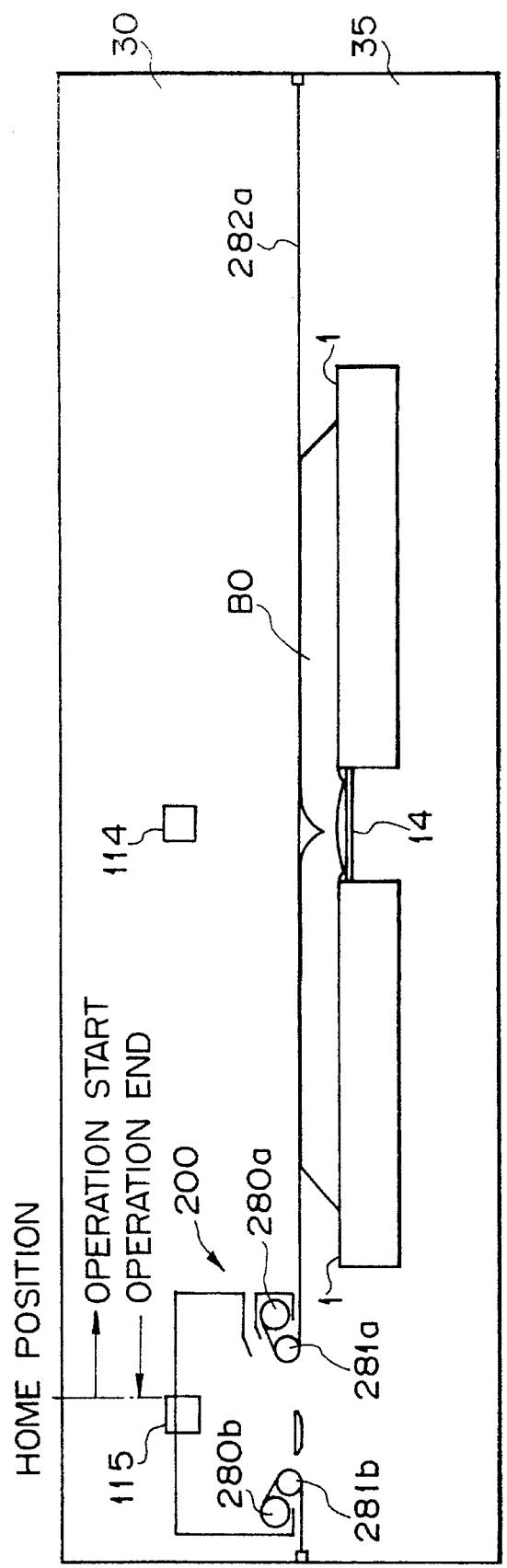
FIG. 24 is a schematic view illustrating a basic internal structure of the camera of FIG. 22 as viewed from the side surface and a circuit block as well.
Figure 23:
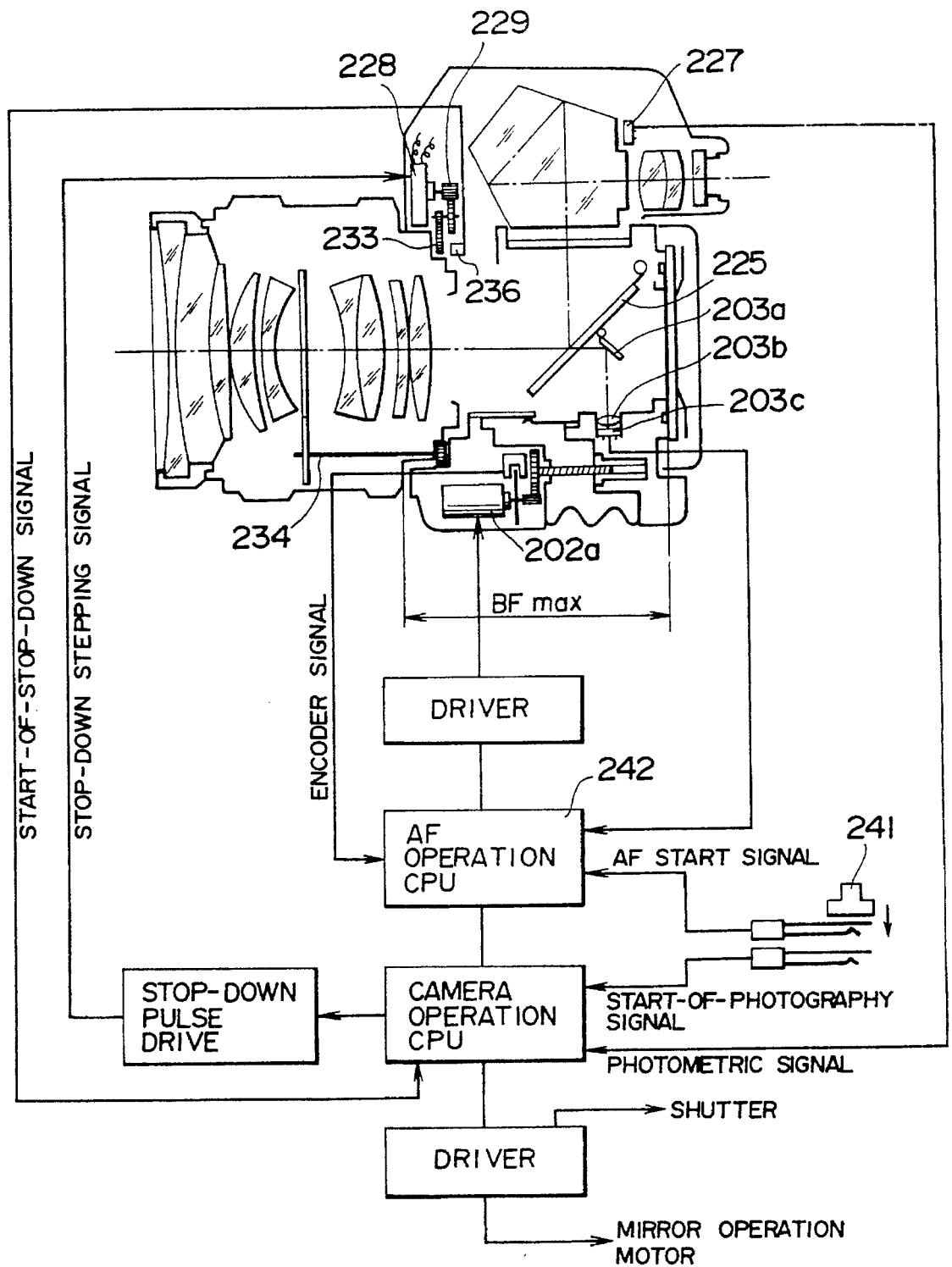
FIG. 23 is a schematic view illustrating an internal structure of the camera of FIG. 22 as viewed from the side surface and a circuit block as well.
Figure 24:
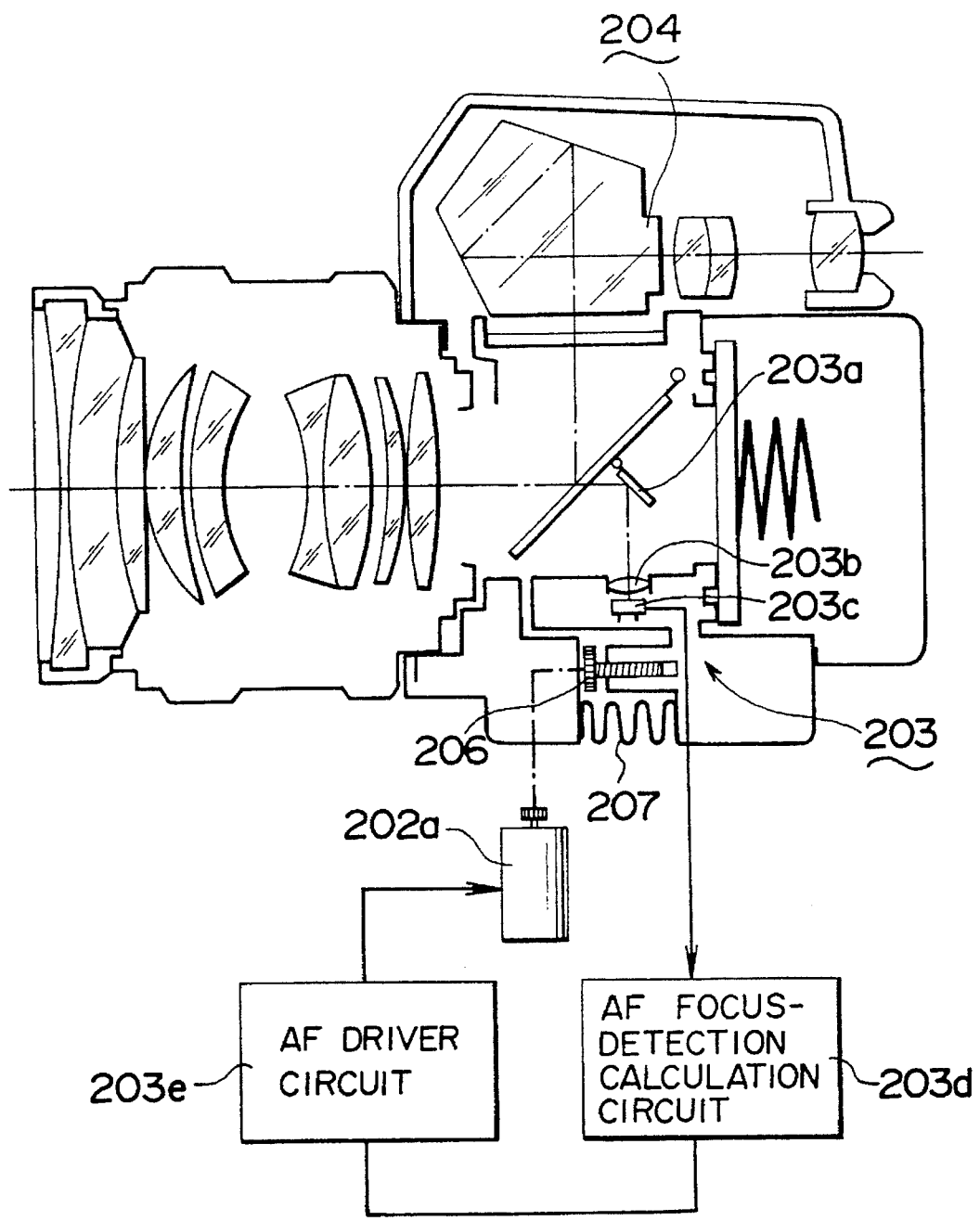
Figure 25:
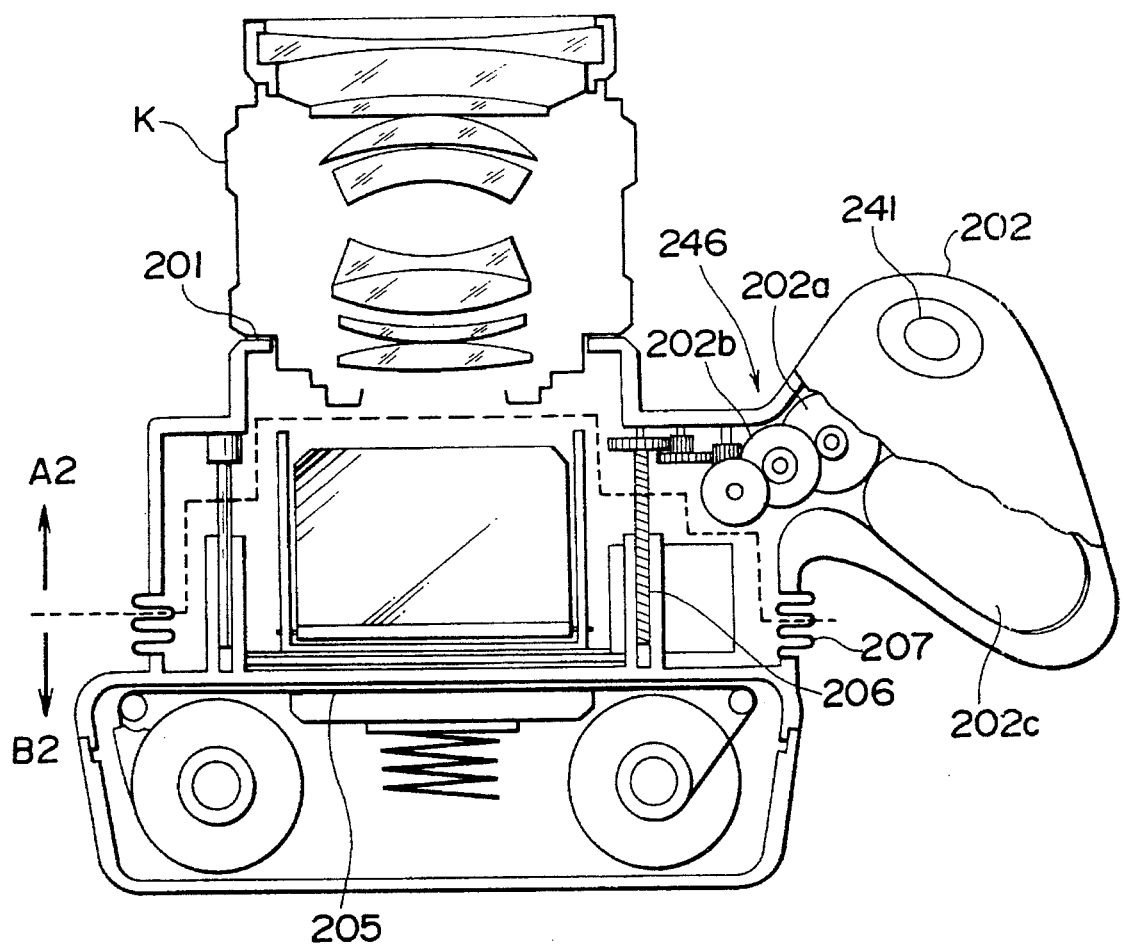
FIG. 25 is a schematic view illustrating a basic in-plane structure of the camera of FIG. 22.

FIG. 23 is a schematic view illustrating the internal structure of the camera of FIG. 22 as viewed from the side surface and a circuit block as well. FIG. 24 is a schematic view illustrating the basic internal structure of the camera of FIG. 22 as viewed from the side surface and a circuit block as well. FIG. 25 is a schematic view showing a basic in-plane structure of the camera of FIG. 22.

In the constructive elements in FIGS. 22–25, the same members are marked with the like symbols.

To start with, an explanation will be given with reference to FIGS. 24 and 25.

Referring to the Figures, a photographing lens barrel K is installed in a lens mount 201. It is also possible to install different-mount lenses through the intermediary of a conversion mount. A grip 202 for holding the camera includes an AF drive source 246 for autofocusing which comprises an AF motor 202a for an autofocus adjustment, a gear train 202b and a battery 202c. The grip 202 also includes a release button 241. The lens mount 201 and the grip 202 are combined to constitute a front block A2. A rear block B2 comprises a focus-detection mechanism 203, a finder mechanism 204 and a film feeding/holding mechanism 205. The focus-detection mechanism 203 is constructed of an auxiliary mirror 203a, a re-imaging lens 203b, a focus-detection sensor 203c, an AF focus-detection calculation circuit 203d and an AF driver circuit 203e. An AF adjustment mechanism 206 adjusts a focal point by moving the rear block B2 with respect to the front block A2 in the optical-axis direction of the photographing lens. A light-shielding bellows 207 prevents a leakage of light involved in the relative movement of the rear block B2 with respect to the front block A2. The bellows 207 is not, however, particularly required when hermetically encasing the rear block B2 into the camera dark box.

Next, the operation based on this construction will be explained.

Now, the photographing lens barrel K is mounted in the lens mount 201 of the front block A2. The AF driving source 246 is drive by an output of the focus-detection mechanism 203. The rear block B2 is moved in the optical-axis direction of the photographing lens by actuating the AF adjustment mechanism 206, thus adjusting a focal point.

Note that the focus adjustment can be done by moving only the film holding mechanism in accordance with an output of the AF focus-detection calculation circuit with an improved construction of the present invention. It is also feasible to automatically manually adjust the focal point while repeating the focus detection and making a visual recognition through the finder simply by moving a minimum number of members in conjunction with an optically conjugate positional relationship between the film plane, the AF sensor plane and the finder plane.

Given next is a further description of the sixth embodiment with reference to FIGS. 22 and 23.

A mirror drive motor 211 for driving a main mirror 225 and an auxiliary mirror 203a in a mirror box disposed in the rear block B2. Provided also are a motor pinion 212, a gear train 213, a lower cam 214, an upper cam 215, a lever 216, a lever 217, a pin 217a embedded in the lever 217, an L-shaped lever 218 and a pin 218a embedded in the L-shaped lever 218. Provided further are a shaft 219 for connecting a link 220 to the lever 218, a pin 221 embedded in the link 220, a mirror-up lever 222, a roller pin 223, a mirror lever 224, a photometric sensor 227, a diaphragm drive stepping motor 228 disposed in the front block A2, a stepping motor pinion 229, a stepping motor gear train 230 and an interlocking pinion 231. Provided still further are a stop-down ring gear element 232, a stop-down ring 233, a lever engagement protrusion 233a formed on the stop-down ring 233, a diaphragm lever 234, a start lever 235, a photo interrupter 236, a protrusion formed on the stop-down ring 233 and a start lever restoration spring 238.

Next, the operation will be described.

As illustrated in FIGS. 22 and 23, the front block A2 incorporates the lens mount 201 for the photographing lens barrel K and the camera grip 202. Disposed in the front block S2 is a diaphragm control mechanism (provided independently in separation from the mirror box mechanism) comprising the stop-down ring 233 having the lever engagement protrusion 233a engaging with the lens diaphragm lever 234 and capable-of adjusting an aperture quantity of the lens by varying an angle of rotation and the diaphragm drive stepping motor 228 for driving this stop-down ring 233. Only the lens diaphragm can be thus arbitrarily operated. When operated, the diaphragm stepping motor 228 is started by a stepping signal given from the stepping drive circuit. For enhancing an accuracy of an aperture adjusting quantity from an open fiducial position of the diaphragm lever 234, however, a start blade intercept the light of the photo interrupter from when coming the fiducial position, and counting is effected exactly from the start signal.

A front plate of the front block A2 is provided with three lengths of direct-acting guide shafts 243a, 243b, 243c. Guide bearings 244a, 244b, 244c for these guide shafts are provided in the rear block constructed mainly of the mirror box mechanism including a focus-detection sensor module and of the film feeding unit. Provided further is a lead screw 245 composed of a ball screw for adjusting the focal point by moving the rear block in parallel to the optical-axis. These guide shafts 243a, 243b, 243c and the lead screw 245 are connectively provided in the front block. Then, the arrangement is that a gear integral with an internal thread of the lead screw 245 is driven by a motor 303a and a gear connected thereto in the front block; and the rear block is thereby movable in parallel to the optical-axis along the guide shaft. Turning to FIG. 22, the above AF adjustment mechanism is located opposite to the AF adjustment mechanism shown in the basic structural view of FIG. 25. As described above, with the parallel movement in the optical axis direction of the film focus plane existing in the rear block, the focus adjustment of the installed lens can be attained in accordance with the distance of each subject.

On the other hand, a part of the beams from the subject which have passed through the photographing lens travel through a half-mirror element of the main mirror 225 and guided downward by the auxiliary mirror 203a provided on the rear side thereof. The subject-beams are projected on the focus-detection sensor 203c via the re-imaging lens 203b, thus performing the focus-detecting operation.

Given next is an explanation in sequence of the photographing actions.

The operation is started by half-depressing the release button 241. Subsequently, an AF operation CPU 242 arithmetically processes a focus-detection signal relative to the subject-beams projected on the focus detection sensor 203c. The rear block B2 is driven to an in-focus position by the AF motor 202a. The rear block B2 is therefore aligned to the in-focus position corresponding to a subject distance and then stops.

Further, when full-depressing the release button 241, the mirror drive motor 211 rotates clockwise as viewed from above in FIG. 22. The lower and upper cams 214, 215 are rotated through the gear train 213 connected to the motor pinion 212. Consequently, the upper cam 215 presses the lever 216, while the lever 217 rotates counterclockwise about the shaft 217b. The pin 217a provided at the tip of the lever 217 impinges on the pin 218a embedded in the vertically L-shaped. The L-shaped lever 218 is thereby rotated counterclockwise about the shaft 218b, thus raising upward the shaft 219 for connecting the link 220 to the L-shaped lever 218. As a result, the pin 221 embedded in the link 220 pushes up the mirror-up lever 222. The roller pin 223 attached to the mirror lever 224 is thereby thrust up. The main mirror 225 is moved up while nesting the auxiliary mirror 203a. Further, the diaphragm action is completed simultaneously with the mirror-up action or at least after completing the mirror-up action till the shutter operation is started.

Now, the beams penetrating the photographing lens are reflected upward by the main mirror 225 and guided to the finder. Hereat, the sensor 227 effects a photometric process on a part of the beams, and the camera operation CPU 242 performs a calculation thereof, thus obtaining an exposure quantity determined by a shutter speed and an aperture quantity. The camera operation CPU 242, however, transmits a stepping signal for a diaphragm action to the diaphragm drive stepping motor 228. The drive stepping motor 228 rotates in response to this stepping signal. Rotations of the stepping motor 228 are transferred to the interlocking pinion 231 via the stepping motor gear train 230 from the stepping motor pinion 229. The interlocking pinion 231 meshes with the stop-down ring gear element 232 of the stop-down ring 233, and, therefore, the stop-down ring is rotated counterclockwise by a fixed quantity. At this time, the diaphragm lever 234 and the engagement protrusion 233a of the stop-down ring 233 move counterclockwise, and simultaneously another protrusion 237 of the stop-down ring 233 separates from the start lever 235. Consequently, the start lever 235 works to intercept the light of the photo interrupter 236 by dint of the restoring force of the start lever restoration spring 238. A start signal is generated therefrom. This is defined as a fiducial position for measuring the aperture quantity. The stop-down ring 233 is rotated by a quantity counted from this, thereby obtaining a proper aperture with the follow-up diaphragm lever 234. After an end of the photography, the stepping motor is rotated reversely and returned to an aperture open position.

The reason why the aperture quantity count fiducial position is thus provided lies in preventing the stop-down start fiducial position from coinciding with the start position of the stepping motor due to scatters of working accuracies of the interlocking gear and member interposed therebetween and of the stop position of the diaphragm interlocking pin of each lens. The above reason also lies in securing an automatic diaphragm operation with a high accuracy.

Thus, the aperture open fiducial position (a stop-down start position) for each interchangeable lens is determined by the start lever 235 extendable with respect to the micro motion. The diaphragm operation with an extremely high accuracy can be attained.

Note that because of following up each aperture value set by the lens barrel, the stepping signal to the minimum aperture value is transmitted by pushing down the operation button in a manual stop-down operation for confirming a focal depth, and the stop-down lever is moved to the maximum position.

In accordance with the sixth embodiment discussed above, the autofocus function works by use of even the conventional manual focus lens and a different type of autofocus lens. Besides, it is, as a matter of course, to possible to adjust the focal length irrespective of a size of the lens installed. It is also feasible to actualize the practicable automatic diaphragm mechanism of the autofocus single-lens reflex camera of such a type that the front and rear blocks are relatively moved, wherein the mirror quick return mechanism and the automatic diaphragm mechanism are capable of performing the independent sequential operation in accordance with the photographing operation of the camera by use of their drive mechanisms.

Seventh Embodiment

Figure 26:
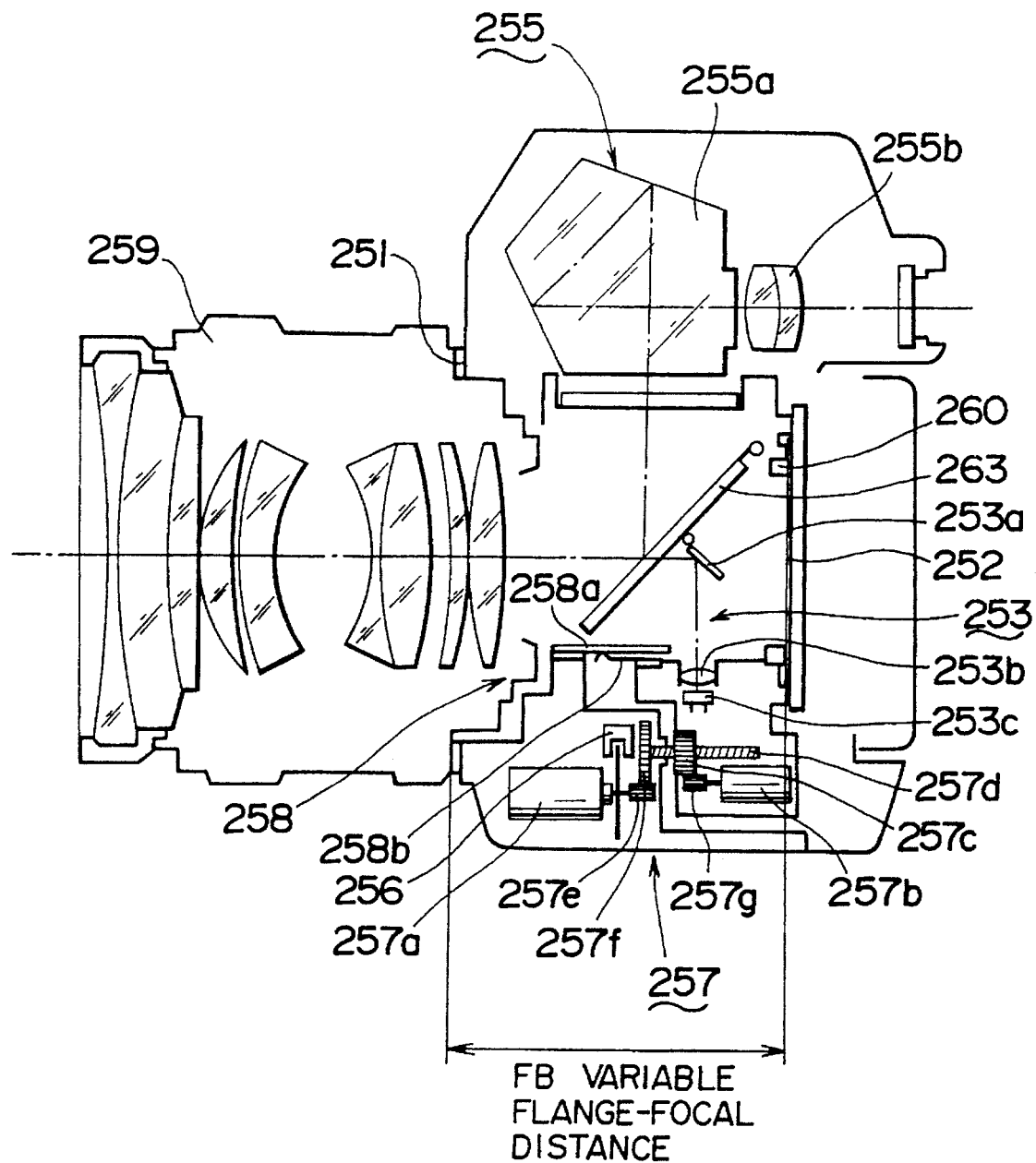
FIG. 26 is a schematic front view of a drive mechanism but illustrating a seventh embodiment of the autofocus single-lens reflex camera according to this invention.

FIG. 26 is a schematic front view of the drive mechanism but illustrates a seventh embodiment of the autofocus single-lens reflex camera according to this invention.

Figure 29:
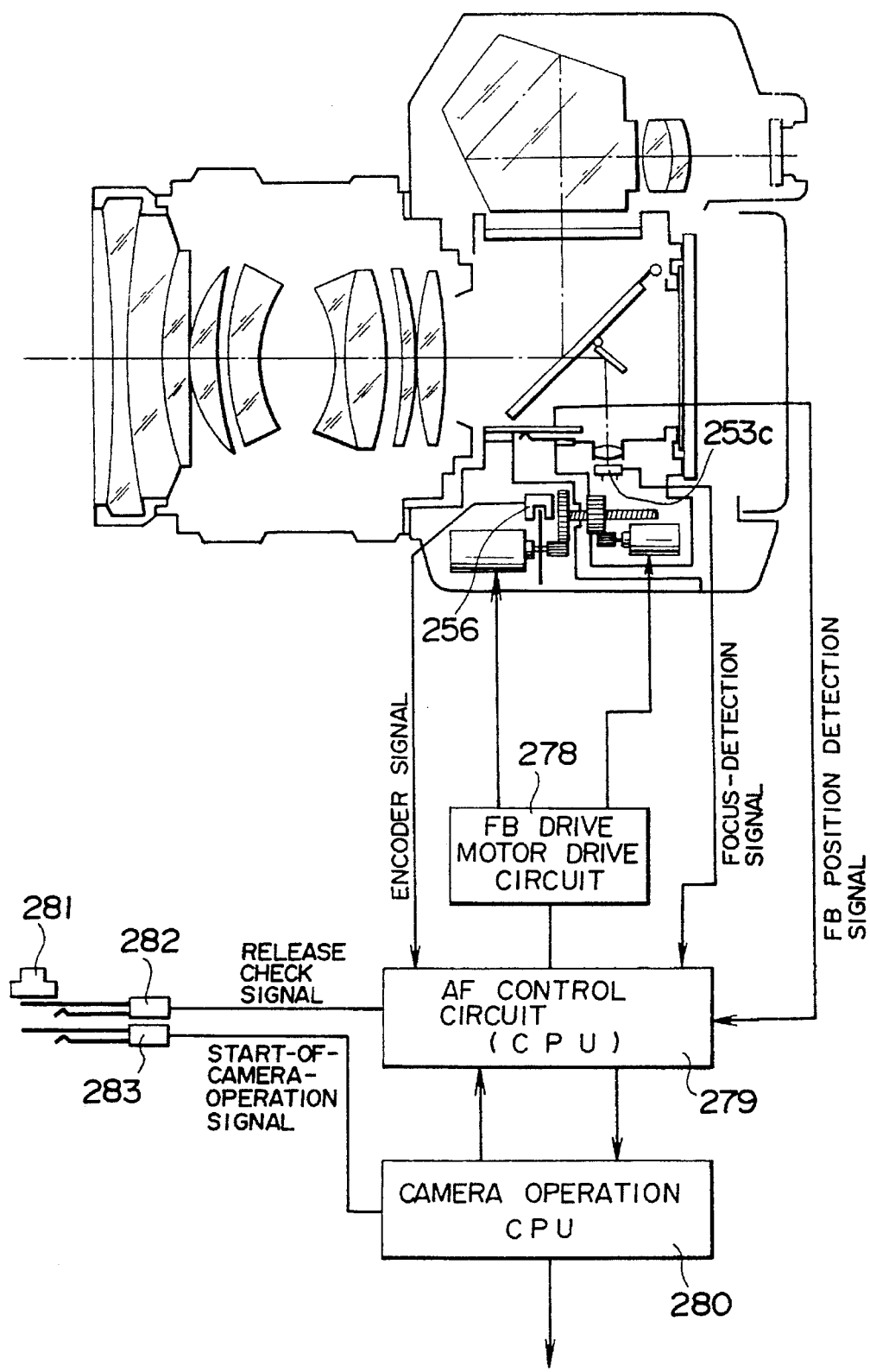
FIG. 29 is a schematic view showing an embodiment of a control circuit of the drive mechanism of FIG. 26.

The camera body front block comprises an interchangeable lens 259, a lens mount 251 and a grip including a part of an AF drive mechanism 257 and a release button 281 (see FIG. 29). The camera body rear block comprises an up-and-down mirror 263, a finder mechanism 255, an aperture 260, an exposure mechanism, a film feed mechanism and a focus detection mechanism 253.

Beams of light from the unillustrated subject travel through the interchangeable lens 259 and guided upwards by the up-and-down mirror 263. The beams are then incident on the finder mechanism 255. The beams are collimated by a pentaprism 255*a* into beams parallel to the principal optical-axis. The beams then reach an eyepiece 255*b*. A part of the beams from the subject which passed through the interchangeable lens 259 fall on an AF auxiliary mirror 253*a* of the focus detection mechanism 253 and are then guided downward. The beams come to an AF sensor 253*c* via an AF lens 253*b*.

The AF drive mechanism 257 comprises a coarse drive unit constructed of a flange-focal distance (hereinafter terms an [FB]) coarse drive motor 257*a*, an encoder 256, a gear 257*e* fixed to the drive shaft of a motor 257*a* and a lead screw 357*d* fixed to a gear 257*f*. The AF drive mechanism 257 also comprises a fine drive unit constructed of a FB finer drive motor 257*b*, a gear 257*g* fixed to the drive shaft of a motor 257*b* and a fine drive gear 257*c*. A gear element formed on the outer peripheral portion of the fine drive gear 257*c* meshes with the gear 257*g*. A central female screw engages with the lead screw 257*d*.

The FB coarse drive motor 257*a* of the coarse drive unit is fixed to the front block. The FB fine drive motor 257*b* of the fine drive unit is fixed to the rear block.

A rotational output of the FB coarse drive motor 257*a* is reduction-transferred to the lead screw 257*d* via the gears 257*e*, 257*f*. At the same time, the number of revolutions of this motor is measured by the encoder 256, and a coarse drive quantity is thereby controlled.

Simultaneously, a rotational output of the FB fine drive motor 257*b* is also transferred to the fine drive gear 257*c* via the gear 257*g*, and a drive quantity is finely controlled. That is, the coarse drive unit effects high-speed driving and, at the same time, drives the fine drive unit during the driving process. Conducted thereby are before-and-after fine driving processes in segmented range areas till a target segmented range portion is reached. When reaching the target segmented range area, the control is executed so that the reached position serves as a in-focus point.

With this processing, it follows that the rear block is precisely moved to the in-focus position at a high speed with respect to the camera body front block.

The FB coarse drive motor 257*a* involves the use of a DC motor. The fine drive motor 257*b* involves the use of a step motor or a DC motor having an encoder.

A position detection switch 258 is capable of detecting data indicating a positional relationship between the front block and the rear block. A code pattern substrate 258*a* constituting the position detection switch 258 is fixed to the proximal portion of the front block. A terminal of a contact 258*b* is fixed to the proximal portion of the rear block. When distance between the front and rear block varies, a code of the code pattern substrate 258*a* fluctuates, thereby obtaining an FB position detection signal.

Note that the position detection switch 258 may take other methods such as making the detection through a slide resistor, and so on.

The connection structure between the front and rear blocks is the same as the connection structure in the first embodiment. Further, the structure of making the movement to cause no deviation of the optical-axis between the front and rear blocks in a state where the aperture plane and the lens mount plane keep the parallelism is attained with the guide bar and the hole for guiding the bar as in the first embodiment.

Figure 27:
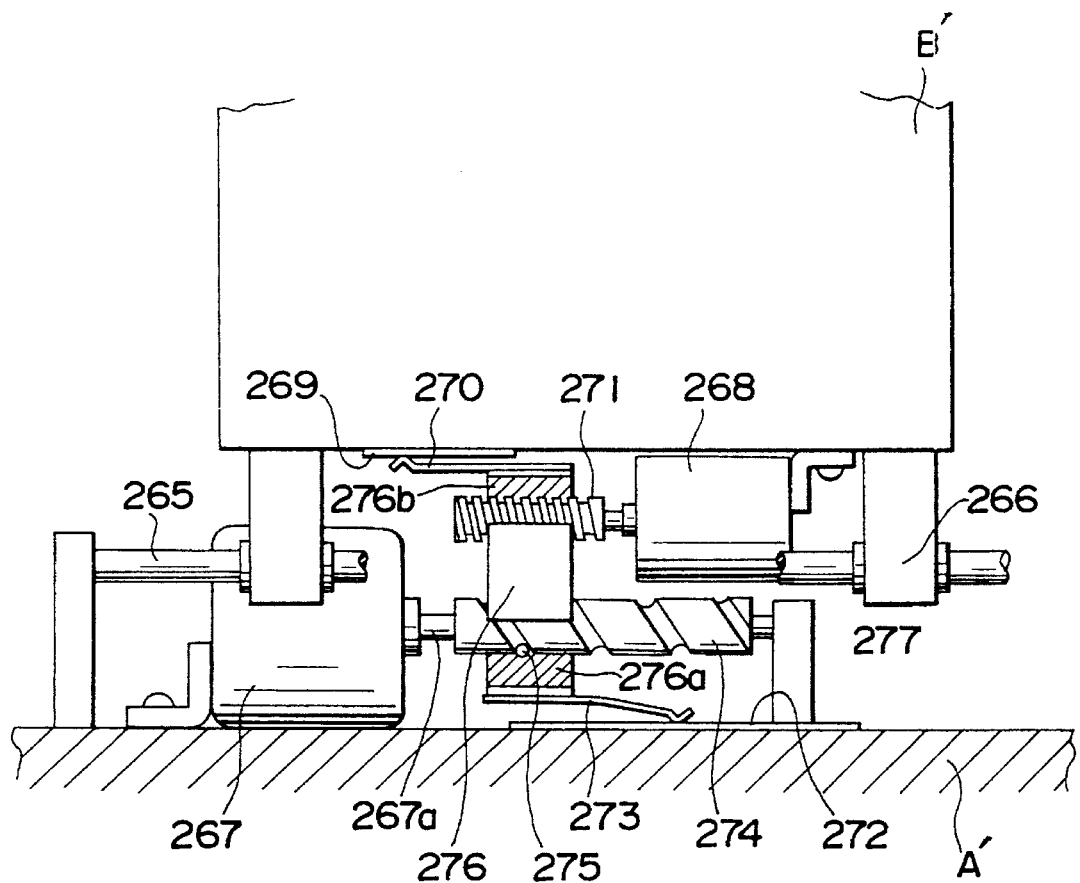
FIG. 27 is a schematic view illustrating an other embodiment of the drive mechanism of FIG. 26.

FIG. 27 is a schematic view illustrating another embodiment of the drive mechanism of FIG. 26.

This drive mechanism includes coarse and fine drive motors involving use of pulse motors, and elements other than the drive mechanism are omitted.

A fixed unit A' and a movable unit B' correspond to the front and rear blocks of FIG. 26, respectively.

A coarse drive motor 267 is disposed in the fixed unit A'. The coarse drive motor 267 has its drive shaft 267*a* to which one end of a ball screw 274 for a coarse movement is directly connected. The other end of the coarse movement ball screw 274 is rotatably fitted to a support member 277. A thread 276*a* formed in the lower portion of a nut member 276 meshes with the coarse movement ball screw 274. The nut member 276 rectilinearly moves with rotations of the ball screw.

A slider 273 is attached to a lower surface of the nut member 276. The slider 273 slides on a code pattern of a coarse driving position detection code pattern substrate 272 provided in the fixed unit A'. A moving position thereof can be recognizable.

Figure 28:
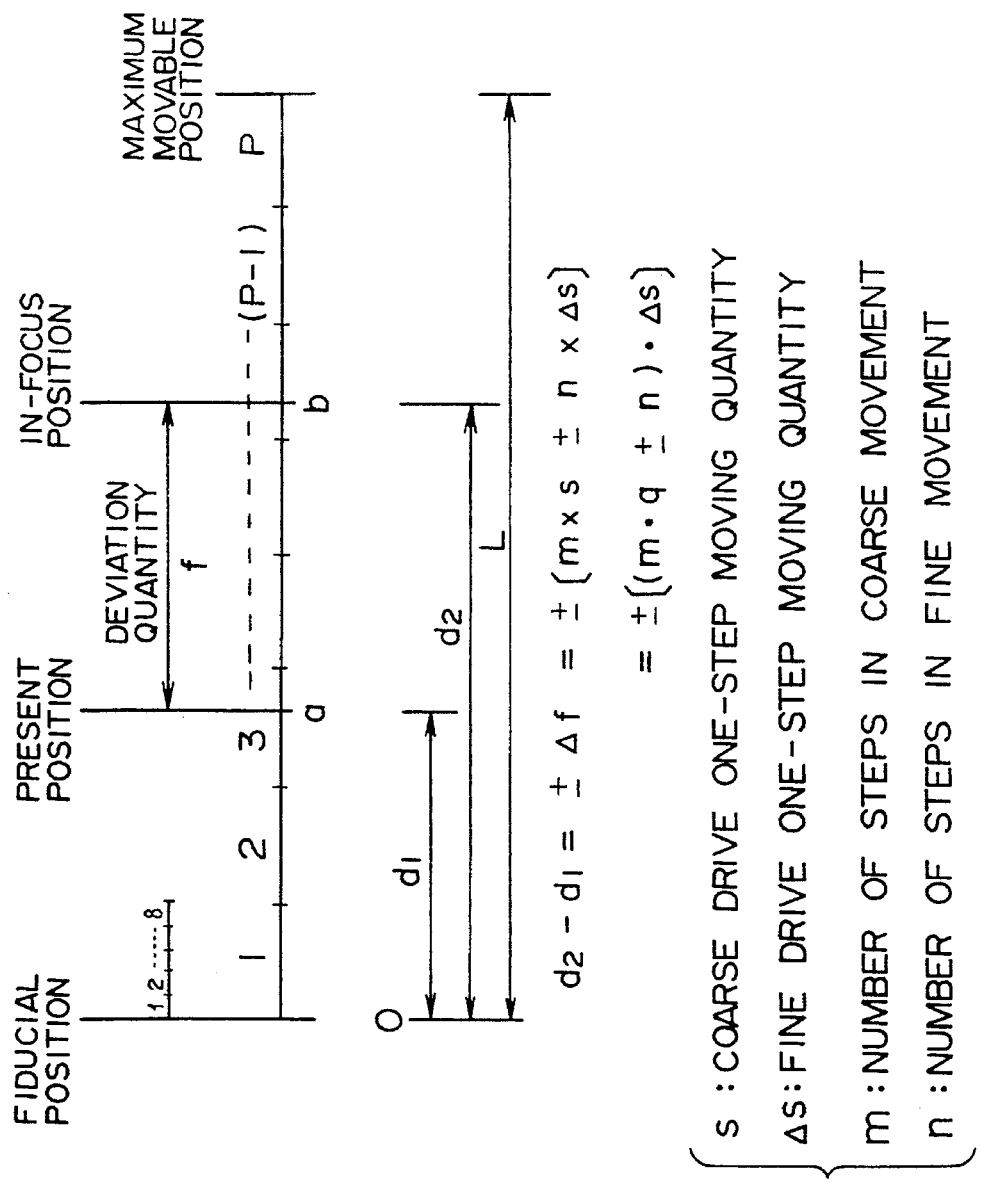
FIG. 28 is a view of assistance in explaining an operating principle of the drive mechanism of FIG. 26.

FIG. 28 is a view, showing segmented areas of a movable range, of assistance in explaining an operating principle of the drive mechanism of FIG. 26.

Now, let L be a moveable distance of the movable unit B'. The distance L is divided by p, and the slider 273 of the position detection switch of the coarse drive unit moves by one unit s with respect to one-step rotation of the coarse drive motor.

More specifically, when the position detection code consists of a 4-bit gray code, p is 16, and the one unit s turns out a unit on which the movable distance L is divided by 16. The position detection switch detects which one of the 16-divided units s to move.

On the other hand, a fine drive pulse motor 268 is provided in the movable unit B'. A lead screw 271 for a hyperfine movement is fixed to a drive shaft thereof. The hyperfine movement lead crew 271 engages with an upper thread 276*b* of the nut member 276. A slider 270 is fitted to the upper surface of the nut member 276. The slider 270 slides on a code pattern of a hyperfine driving position detection code pattern substrate 269 provided in the movable unit B'. A hyperfine position thereof is recognizable.

Referring to FIG. 28, the one unit s for the coarse drive is a divided-by-q area, and the slider 270 if the position detection switch of the finer drive unit moves by a micro unit Δs with respect to a one-step rotation of the fine drive pulse motor 268.

Considering an actual driving state, when moving from a present position a to an in-focus position b, the point-a position is detected by the position detection switches of the coarse and fine drive units. This position is defined as a distance from the fiducial position (position 0) Let d1 be a distance of this point a and d2 be a distance of the point b. A distance between the points a and b is given by (d2–d1). The symbol (+) herein indicates that the point b exists to the right hand of the point a (the focal point exists in closer proximity to the close-up side than the present position), while the symbol (−) indicates that the point b exists on the left side (the long distance side).

This defocus quantity Δf is analyzed and calculated, and it is assumed that Δf is obtained by adding an m-fold value of one unit s and an n-fold value of the micro unit Δs. Then, ±Δf is given by:

$$\pm\Delta f = \pm(m \times s \pm n \times \Delta s)$$

Note that the symbol (+) implies a shortage in the micro movement when multiplied by m of the coarse movement and indicates a necessity for making a further micro movement, while the symbol (−) implies an excess when multiplied by m of the coarse movement and indicates a return corresponding to the micro movement.

FIG. 29 is a schematic view illustrating an embodiment of the control circuit of the drive mechanism of FIG. 26.

The code pattern substrate outputs an FB position detection signal relative to the code signal. The encoder 256 outputs an encoder signal. The AF sensor 253c outputs a focus-detection signal (AF data).

The AF control circuit 279 inputs this FB position detection signal, the encoder signal and the focus-detection signal. The AF control circuit 279 thus confirms a present FB position and calculates a defocus quantity. Then, a first release button 282 is turned ON by half-depressing the release button 281. A release check signal is thereby transmitted to the AF control circuit 279. The FB drive motor drive circuit 278 simultaneously drives the respective motors of the coarse and fine drive units. With these actions, the in-focus operation is carried out.

A second switch 283 of the second stage is turned ON by further depressing the release button 281. A start-of-camera-operation signal is thereby inputted to the camera operation CPU 280. Mirror-up and shutter mechanisms are operated, and the photography is thus conducted. Subsequently, the mirror-up and film take-up actions are performed, thus completing the camera photographing operation.

Figure 30:
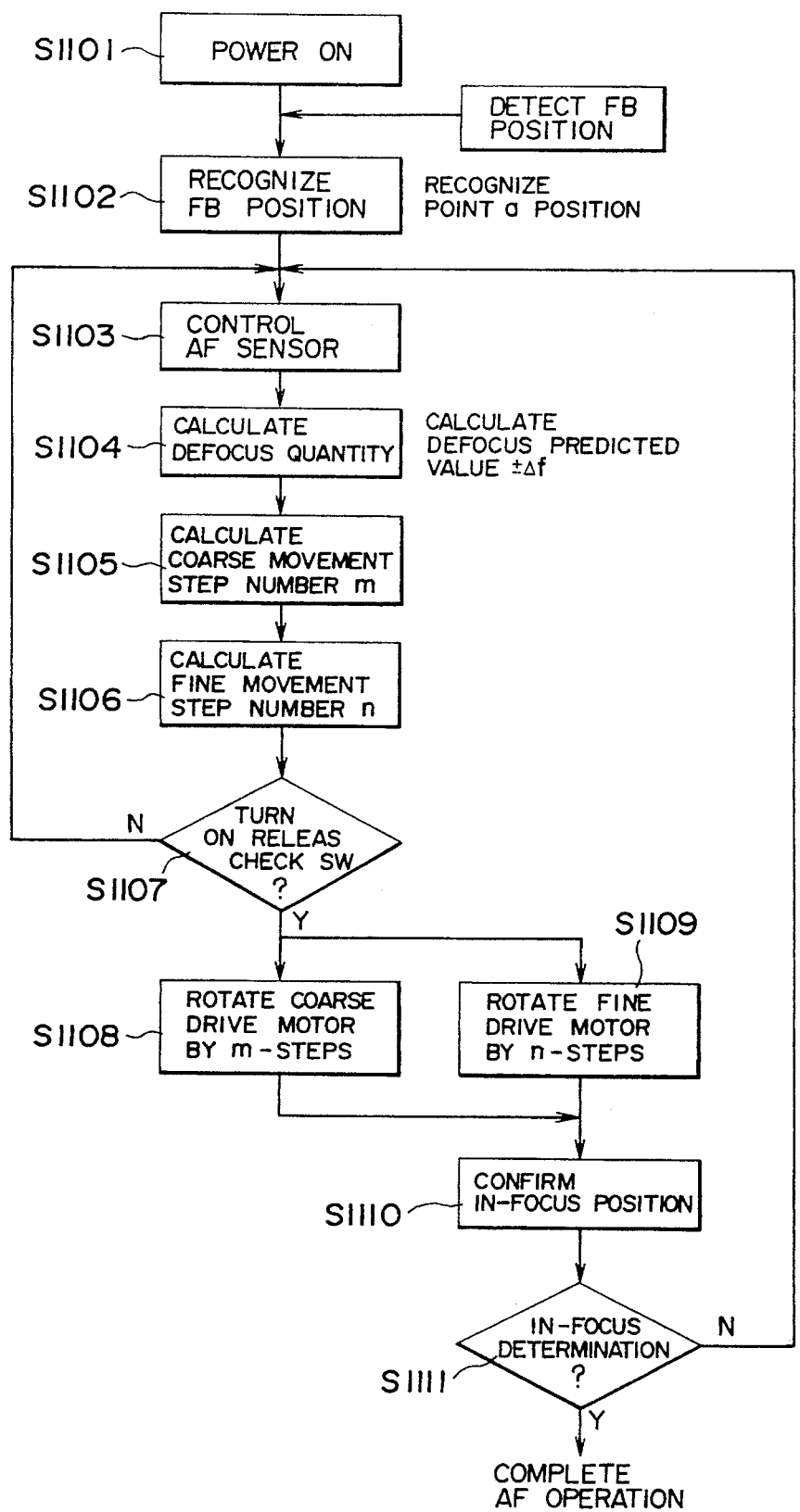
FIG. 30 is a flowchart of assistance in explaining actions of the drive mechanism of FIG. 26.
Figure 31:
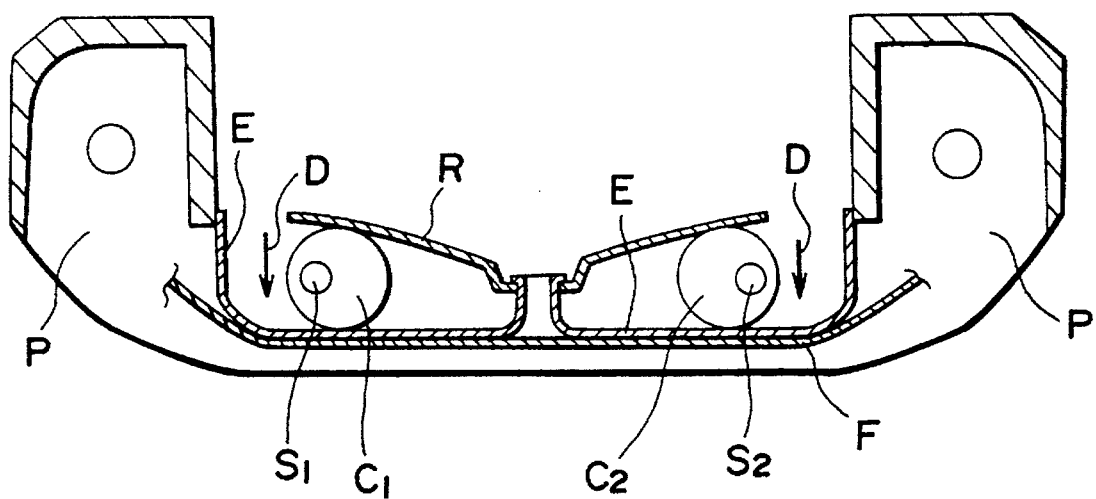
FIG. 31 is a view showing one example of a mechanism for adjusting a flange-focal distance of a conventional camera.
Figure 32:
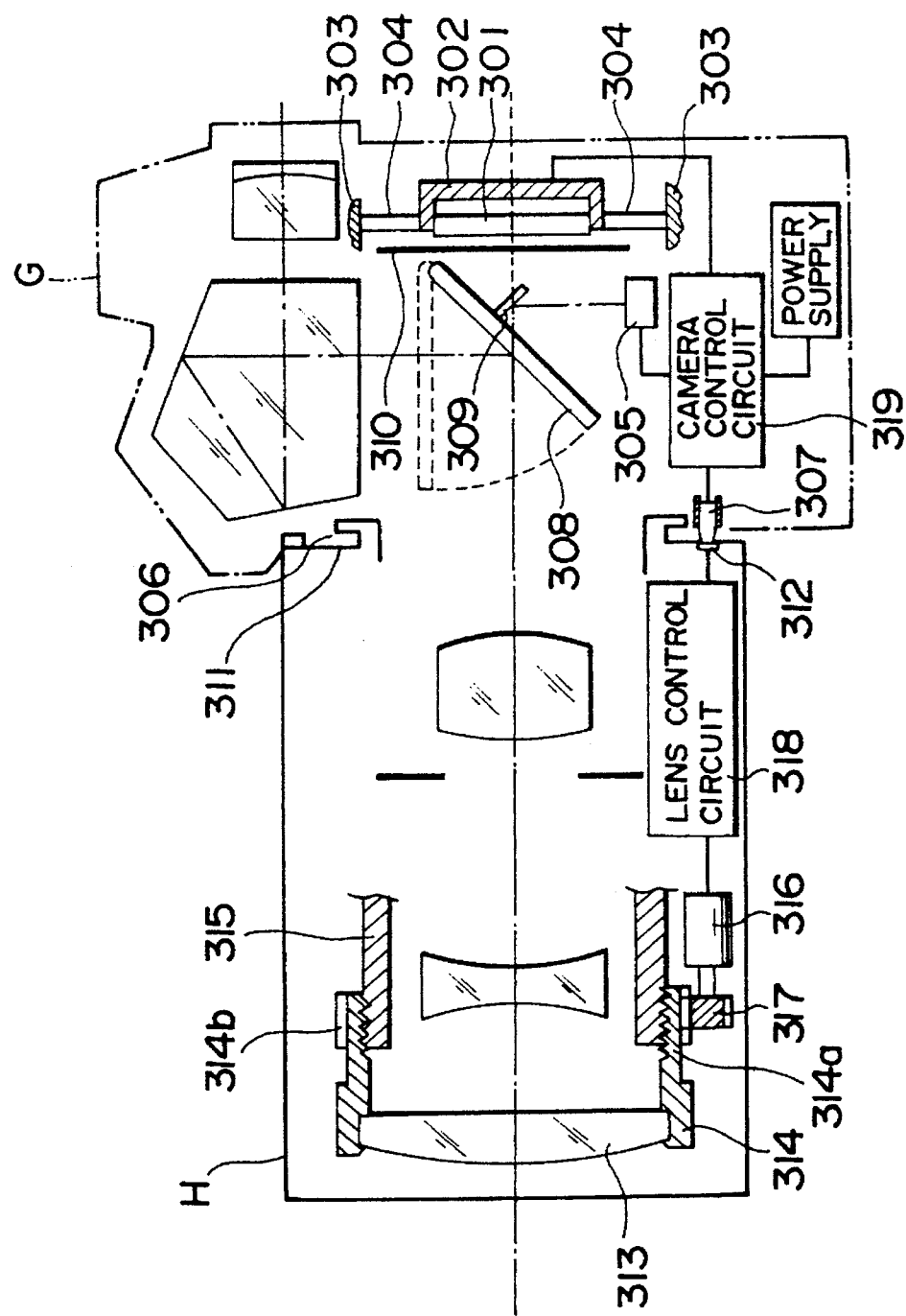
FIG. 32 is a schematic sectional view illustrating a mechanism for adjusting a position of a CCD imaging device of a conventional electronic still camera.

FIG. 30 is a flowchart of assistance in explaining the operation of the drive mechanism of FIG. 26.

A power supply of the camera is switched ON (S1101) to bring the AF control circuit 279 of the camera into a standby status. Then, the AF control circuit 279 detects a present FB position from the FB position detection signal (S1102). This is a positional confirmation of the point a in FIG. 28.

Next, a signal from the AF sensor is taken in (S1103), and the defocus quantity ±Δf is calculated (S1104). With this processing, a coarse movement step number m and a fine movement step number n are calculated (S1105, S1106).

Next, a release check is effected by half-depressing the release button 281 (S1107). Then, the AF control circuit 279 simultaneously drives the coarse and fine drive motors by controlling the FB drive motor drive circuit 278 (S1108, S1109). More specifically, the coarse drive motor rotates by m-steps, while the fine drive motor rotates by n-steps. Then, after confirming an in-focus position (point b) (S1110), an in-focus determination is made based on the AF signal (S1110). If determined to be an in-focus status, the AF operation is ended.

If there is some deviation of the drive quantity based on a defocus predicted value in making the in-focus determination for a final confirmation, the operation goes back again to the calculation of the defocus quantity, and it follows that the error is repeatedly corrected.

According to the seventh embodiment discussed above, the rear block having a considerable weight and capacity is precisely moved at the high speed, and the focusing control can be thus done in the back-focal distance control system autofocus single-lens reflex camera.

In accordance with the first through seventh embodiments discussed above have given the explanation, wherein the camera body front block incorporates the grip unit; the rear block is made movable on the basis of the front block, thereby adjusting the flange-focal distance. It is, however, apparent that the camera works similarly even by making the front block movable on the basis of the rear block incorporating the grip unit.

Furthermore, with this arrangement, the AF drive mechanism for adjusting the flange-focal distance may be provided in the rear block.

It is apparent that, in this invention, a wide range of different working modes can be formed based on the invention without deviating from the spirit and scope of the invention. This invention is not restricted by its specific working modes except being limited by the appended claims.

What is claimed is:

1. An autofocus single-lens reflex camera having an interchangeable photographic lens system, comprising:

a fixed block comprising a lens mount for a photographic lens, the photographic lens having an optical axis and defining a focal point, a movable block comprising a focus detection mechanism, a finder mechanism, and a film aperture element, the fixed block and the movable block defining a distance therebetween, a connection unit for connecting the fixed block and the movable block and for adjusting the distance between the fixed block and the movable block, and an autofocus driving source for autofocusing and for moving the movable block in the direction of the optical axis of the photographic lens to thereby adjust the focal point.

2. An autofocus single-lens reflex camera for focusing by adjusting a flange-focal distance of a photographic lens and having an interchangeable photographic lens system, comprising:

a fixed block comprising a lens mount for the photographic lens, the photographic lens having an optical axis and defining a focal point, a movable block comprising a focus detection mechanism, a finder mechanism, and a film aperture element, the fixed block and the movable block defining a distance therebetween, a connection unit for connecting the fixed block and the movable block and for adjusting the distance between the fixed block and the movable block, an autofocus drive mechanism for autofocusing, for moving the movable block in the direction of the optical axis of the photographic lens to thereby adjust the focal point, and for adjusting the distance between the lens mount of the fixed block and the aperture element of the movable block on the basis of autofocus data, a power switch for the camera body that is switchable to an off position, and a control unit for operating the autofocus drive mechanism and for adjusting the distance between the lens mount of the fixed block and the aperture element of the movable block to a position at which the focal length of the photographic lens is infinity when a switching means for switching between autofocus and manual focus is switched to manual focus, or when the power switch is switched to the off position.

3. An autofocus single-lens reflex camera for focusing by adjusting a flange-focal distance of a photographic lens and having an interchangeable photographic lens system, comprising:

a fixed block comprising a lens mount for the photographic lens, the photographic lens having an optical axis and defining a focal point, a movable block comprising a focus detection mechanism, a finder mechanism, and a film aperture element, the fixed block and the movable block defining a distance therebetween, a connection unit for connecting the fixed block and the movable block and for adjusting the distance between the fixed block and the movable block, an autofocus drive mechanism for autofocusing, for moving the movable block in the direction of the optical axis of the photographic lens to thereby adjust the focal point, and for adjusting the distance between the lens mount of the fixed block and the aperture element of the movable block on the basis of autofocus data, a storage unit for storing characteristic data about a multiplicity of photographic lens installed in the lens mount of the fixed block, selection means for selecting a type of the photographic lens installed in the lens mount of the fixed block, and control means for reading the data of the photographic lens selected by the selection means, calculating an accurate defocus quantity and a moving quantity between the fixed block and the movable block from focus detection data obtained simultaneously and controlling the autofocus drive mechanism on the basis of calculation data thereof.

4. An autofocus single-lens reflex camera for focusing by adjusting a flange-focal distance of a photographic lens and having an interchangeable photographic lens system, comprising:

a fixed block comprising a photographic lens and a lens mount for the photographic lens, the photographic lens having an optical axis and defining a focal point, a movable block comprising a focus detection mechanism, a finder mechanism, and a film aperture element, the fixed block and the movable block defining a distance therebetween, a connection unit for connecting the fixed block and the movable block and for adjusting the distance between the fixed block and the movable block, an autofocus drive mechanism for autofocusing, for moving the movable block in the direction of the optical axis of the photographic lens to thereby adjust the focal point, and for adjusting the distance between the lens mount of the fixed block and the aperture element of the movable block on the basis of autofocus data, macro photography operation means for designating close-up photography, and control means for driving the autofocus drive mechanism when the macro photography operation unit designates the close-up photography and shift-controlling a distance between the lens mount of the camera body front block and the aperture element of the rear block to a maximum distance, wherein the flange-focal distance of the photographic lens is set to a maximum position, and a close-up photographic range based on manual lens adjustment is extended.

5. An autofocus single-lens reflex camera having an interchangeable photographic lens system, comprising:

a fixed block comprising a lens mount for a photographic lens, the photographic lens having an optical axis and defining a focal point, a movable block comprising a focus detection mechanism, a finder mechanism, and a film aperture element, the fixed block and the movable block defining a distance therebetween, a connection unit for connecting the fixed block and the movable block and for adjusting the distance between the fixed block and the movable block, and an autofocus driving source for autofocusing and for moving the movable block in the direction of the optical axis of the photographic lens to thereby adjust the focal point, mode selection means for selecting an autofocus cancel mode, a sensor for detecting a contact with a release button, first detection means for detecting a first stroke position of the release button, second detection means for detecting a second stroke position of the release button, and control means for performing an autofocus mode operation when the sensor detects the contact with the release button, canceling and shifting the autofocus mode operation to an manual focus mode when the mode selection means selects the autofocus cancel mode and when the release button reaches the first stroke and effecting control to execute a shutter action when further reaching the second stroke.

6. An autofocus single-lens reflex camera having an interchangeable photographic lens system, comprising:

a fixed block comprising a lens mount capable of incorporating any of a manual focus adjusting type lens and an autofocus only lens, the lens having an optical axis and defining a focal point, a movable block comprising a focus detection mechanism, a finder mechanism, and a film aperture element, the fixed block and the movable block defining a distance therebetween, a connection unit for connecting the fixed block and the movable block and for adjusting the distance between the fixed block and the movable block, and an autofocus driving source for autofocusing and for moving the movable block in the direction of the optical axis of the photographic lens to thereby adjust the focal point, the autofocus driving source comprising:

a first autofocus drive mechanism for focusing by adjusting the distance between the lens mount of the fixed block and the aperture element of the movable block on the basis of autofocus data, and a second autofocus drive mechanism for focusing by propelling the lens on the basis of the autofocus data.

7. The camera of claim 6, comprising:

fiducial position setting means for driving the first autofocus drive mechanism by attaching and detaching the photographic lens and setting a distance between the camera body fixed block and the movable block to a position at which the focal length of the photographic lens is infinity, auto determination means for automatically determining whether the photographic lens installed is an autofocus only lens or a manual focus adjusting type lens, and control means for performing the autofocus operation by controlling the first autofocus drive mechanism when the auto determination means determines the lens to be the manual focus adjusting type lens and controlling the second autofocus drive mechanism when the auto determination means determines the lens to be the autofocus only lens.

8. The camera of claim 6, comprising:

fiducial position setting means for driving the first autofocus drive mechanism by attaching and detaching the photographic lens and setting a distance between the camera body fixed block and the movable block to a position at which the focal length of the photographic lens is infinity, auto determination means for automatically determining whether the photographic lens installed is an autofocus only lens or a manual focus adjusting type lens, and simultaneous operation mode control means for performing the autofocus operation by propelling the autofocus only lens installed when the auto determination means determines the lens to be the autofocus only lens and adjusting the distance between the lens mount of the fixed block and the aperture element of the movable block.

9. The camera of claim 6, comprising:

fiducial position setting means for driving the first autofocus drive mechanism by attaching and detaching the photographic lens and setting a distance between the camera body fixed block and the movable block to a position at which the focal length of the photographic lens is infinity, auto determination means for automatically determining whether the photographic lens installed is an autofocus only lens or a manual focus adjusting type lens, and serial autofocus operation mode control means for performing the autofocus operation by controlling the first autofocus drive mechanism when the auto determination means determines the lens to be the manual focus adjusting type lens, determining whether or not the lens propelled comes to a close-range photographing limit while controlling the second autofocus drive mechanism when the auto determination means determines the lens to be the autofocus only lens and, when reaching the close-range photographing limit, effecting switch over autofocus control on the first autofocus drive mechanism.

10. The camera of claim 6, comprising:

fiducial position setting means for driving the first autofocus drive mechanism by attaching and detaching the photographic lens and setting a distance between the fixed block and the movable block to a position at which the focal length of the photographic lens is substantially equal to infinity, auto determination means for automatically determining whether the photographic lens installed is an autofocus only lens or a manual focus adjusting type lens, and back focal distance mode control means for performing the autofocus operation by controlling the first autofocus drive mechanism when the auto determination means determines the lens to be the manual focus adjusting type lens, determining whether or not the lens is in a position of an infinity focal length when determining the lens to be the autofocus only lens, bringing the lens to an infinite position by the second autofocus drive mechanism when not in the position of the infinity focal length and performing autofocus control by the first autofocus drive mechanism in a state where the lens is in the position of the infinity focal length.

11. An autofocus single-lens reflex camera for focusing by adjusting a flange-focal distance of a photographic lens and having an interchangeable photographic lens comprising:

a fixed block comprising a photographic lens and a lens mount for the photographic lens, the photographic lens having an optical axis and defining a focal point, a movable block comprising a focus detection mechanism, a finder mechanism, and a film aperture element, the fixed block and the movable block defining a distance therebetween, a connection unit for connecting the fixed block and the movable block and for adjusting the distance between the fixed block and the movable block, an autofocus drive mechanism for autofocusing, for moving the movable block in the direction of the optical axis of the photographic lens to thereby adjust the focal point, and for adjusting the distance between the lens mount of the fixed block and the aperture element of the movable block on the basis of autofocus data, an auto diaphragm mechanism of the autofocus single lens reflex camera, comprising:

a motor, driven by a stepping signal corresponding to an aperture quantity calculated by a control circuit to the fixed block, for driving the diaphragm, a stop-down ring rotated by driving the motor and engaging with a diaphragm lever protruding from the photographic lens to make the diaphragm lever to follow, wherein a stop-down action is performed by driving the motor independently of an action of a mirror quick return mechanism for a period from a mirror-up action of the mirror quick return mechanism to a start of exposure by a shutter.

12. An autofocus single-lens reflex camera for focusing by adjusting a flange-focal distance of a photographic lens and having an interchangeable photographic lens system, comprising:

a fixed block comprising a photographic lens and a lens mount for the photographic lens, the photographic lens having an optical axis and defining a focal point, a movable block comprising a focus detection mechanism, a finder mechanism, and a film aperture element, the fixed block and the movable block defining a distance therebetween, a connection unit for connecting the fixed block and the movable block and for adjusting the distance between the fixed block and the movable block, an autofocus drive mechanism for autofocusing, for moving the movable block in the direction of the optical axis of the photographic lens to thereby adjust the focal point, and for adjusting the distance between the lens mount of the fixed block and the aperture element of the movable block on the basis of autofocus data, a coarse drive unit for performing drive-control, when dividing an optical-axis parallel movable range of the movable block into p-pieces of areas further subdividing each of the divided-by-p areas into pieces of segments, between the respective divided-by-p areas, and a fine drive unit for effecting the drive-control between the respective subdivided-by-q segments, wherein an in-focus position is controlled by simultaneously driving the coarse fine drive unit in accordance with obtained by effecting a conversion a predicted arithmetic value up to is obtained from a focus-detection drive unit and the a moving quantity of a shift quantity on an in-focus point which signal.

13. The camera of claim 12, wherein the coarse drive unit and the fine drive unit involve the use of independent stepping motors each exhibiting a different characteristic.

* * * * *